United States Patent
Okabayashi et al.

(10) Patent No.: US 11,112,333 B2
(45) Date of Patent: Sep. 7, 2021

(54) SENSOR FAILURE DIAGNOSTIC APPARATUS

(71) Applicant: DENSO CORPORATION, Kariya (JP)

(72) Inventors: Atsunori Okabayashi, Kariya (JP); Shinya Hoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 329 days.

(21) Appl. No.: 15/763,602

(22) PCT Filed: Sep. 21, 2016

(86) PCT No.: PCT/JP2016/077777
§ 371 (c)(1),
(2) Date: Mar. 27, 2018

(87) PCT Pub. No.: WO2017/090307
PCT Pub. Date: Jun. 1, 2017

(65) Prior Publication Data
US 2018/0275016 A1 Sep. 27, 2018

(30) Foreign Application Priority Data

Nov. 23, 2015 (JP) .............................. JP2015-228272

(51) Int. Cl.
*G01M 15/02* (2006.01)
*F02D 35/02* (2006.01)
(Continued)

(52) U.S. Cl.
CPC ............. *G01M 15/02* (2013.01); *F02B 77/04* (2013.01); *F02B 77/085* (2013.01);
(Continued)

(58) Field of Classification Search
CPC ............................ F02D 19/0623; F02B 77/085
See application file for complete search history.

(56) References Cited

U.S. PATENT DOCUMENTS

2007/0277591 A1  12/2007 Hoshi et al.
2016/0363080 A1  12/2016 Okabayashi
(Continued)

FOREIGN PATENT DOCUMENTS

JP  2009-127460  6/2009
JP  2009-185654  8/2009
(Continued)

OTHER PUBLICATIONS

Machine translation of JP201090736 (Year: 2010).*
Machine translation of JP2009127460 (Year: 2009).*

*Primary Examiner* — Matthew G Marini
(74) *Attorney, Agent, or Firm* — Nixon & Vanderhye, PC

(57) ABSTRACT

A sensor failure diagnostic apparatus includes a first estimation unit to estimate a mixing ratio of each type of a molecular structure included in a fuel, based on combustion parameters when a combustion of an internal combustion engine is executed in different combustion conditions, among the combustion parameters sensed by a combustion sensor, a second estimation unit to estimate the mixing ratio, based on characteristic parameters sensed by a characteristic sensor, a combustion sensor diagnostic unit to determine whether a failure of the combustion sensor exists, based on a sensed value of the combustion sensor when the combustion is not executed, and a characteristic sensor diagnostic unit to determine whether a failure of the characteristic sensor exists, by comparing the mixing ratio estimated by the first estimation unit with the mixing ratio estimated by the second estimation unit when the combustion sensor diagnostic unit determines the combustion sensor is normal.

12 Claims, 9 Drawing Sheets

(51) Int. Cl.
  *F02D 19/06* (2006.01)
  *F02D 41/22* (2006.01)
  *F02B 77/08* (2006.01)
  *F02B 77/04* (2006.01)
  *G01M 15/04* (2006.01)
  *G01M 15/08* (2006.01)
  *G01M 15/11* (2006.01)
  *F02M 26/25* (2016.01)

(52) U.S. Cl.
  CPC ..... *F02D 19/0623* (2013.01); *F02D 19/0634* (2013.01); *F02D 35/023* (2013.01); *F02D 35/028* (2013.01); *F02D 41/222* (2013.01); *G01M 15/042* (2013.01); *G01M 15/048* (2013.01); *G01M 15/08* (2013.01); *G01M 15/11* (2013.01); *F02D 2200/0611* (2013.01); *F02M 26/25* (2016.02)

(56) References Cited

U.S. PATENT DOCUMENTS

2016/0363084 A1   12/2016  Hoshi et al.
2017/0191439 A1*  7/2017  Jayaram .............. F02D 41/1446

FOREIGN PATENT DOCUMENTS

| JP | 2010090736 A | * | 4/2010 |
|---|---|---|---|
| JP | 2010-127172 | | 6/2010 |
| WO | WO 2017/090404 | | 6/2017 |

\* cited by examiner

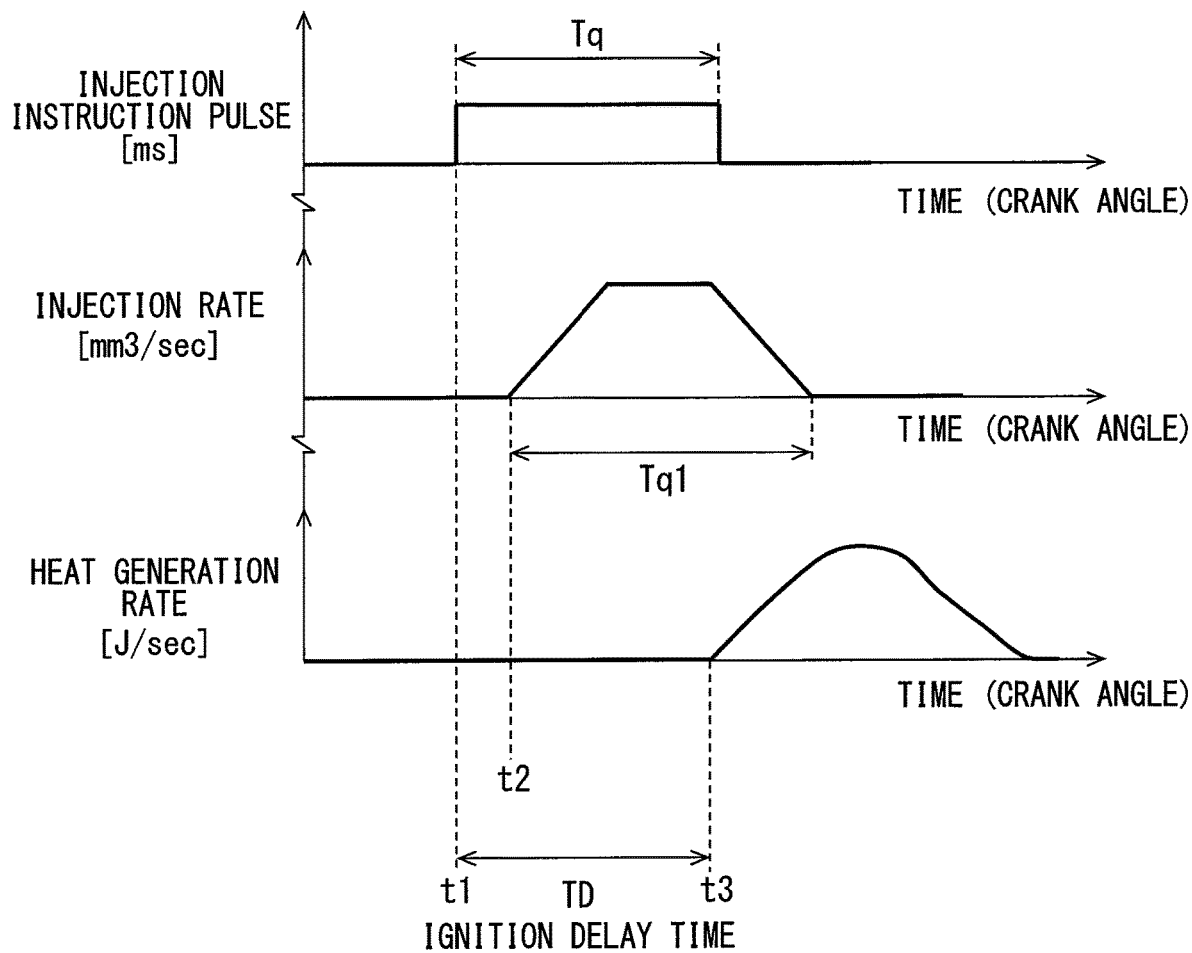

FIG. 4
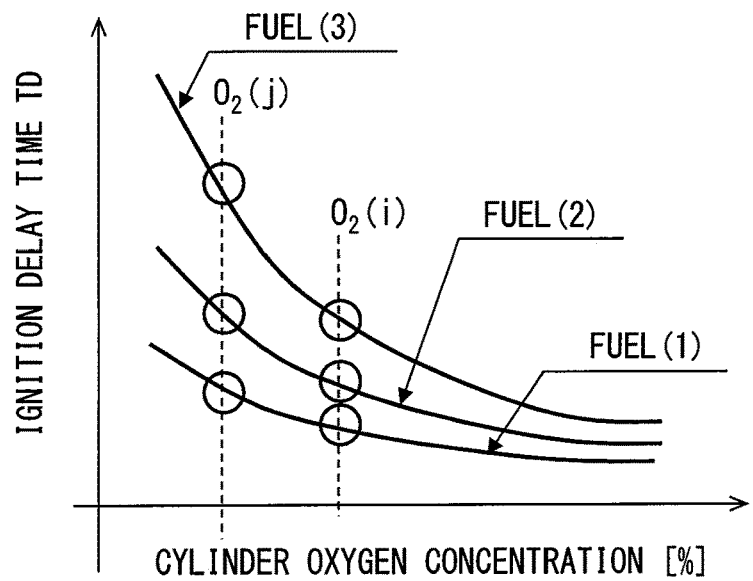
FIG. 5
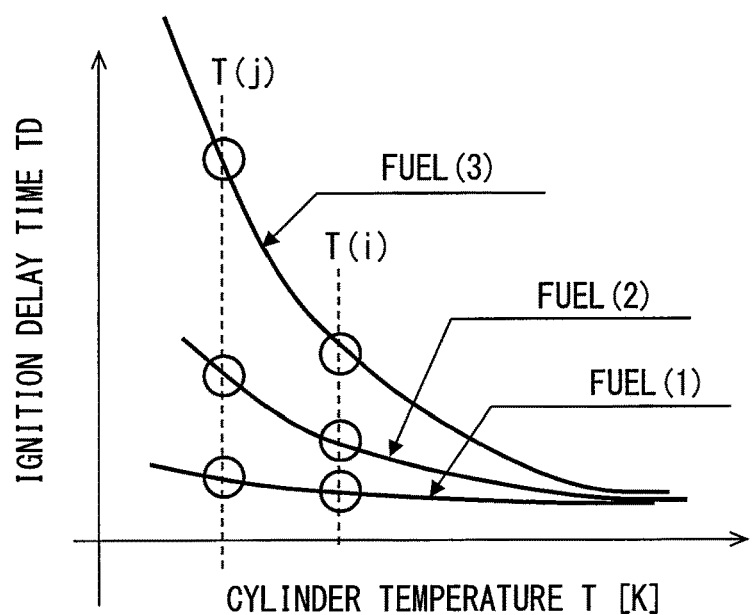
FIG. 6
|  | MOLECULAR STRUCTURE TYPE A | MOLECULAR STRUCTURE TYPE B | MOLECULAR STRUCTURE TYPE C |
|---|---|---|---|
| FUEL (1) | LARGE | LARGE | SMALL |
| FUEL (2) | SMALL | LARGE | SMALL |
| FUEL (3) | LARGE | SMALL | LARGE |

SENSOR FAILURE DIAGNOSTIC APPARATUS

CROSS REFERENCE TO RELATED APPLICATION

This application is the U.S. national phase of International Application No. PCT/JP2016/077777 filed on Sep. 21, 2016 which designated the U.S. and claims priority to Japanese Patent Application No. 2015-228272 filed on Nov. 23, 2015, the entire contents of each of which are incorporated herein by reference.

TECHNICAL FIELD

The present disclosure relates to a sensor failure diagnostic apparatus which diagnoses whether a failure of a sensor included in a combustion system occurs.

BACKGROUND ART

Conventionally, when controlling an operation of a combustion system including an internal combustion engine, it is known that a sensor (combustion sensor) senses a combustion state of the internal combustion engine and a sensed value is used in a next combustion control. For example, a cylinder pressure sensor (combustion sensor) senses a pressure in a combustion chamber. A variation of an ignition time point or a variation of a heat generation rate is estimated based on a sensed result, and then target values of an injection amount of the fuel, an injection time point of the fuel, an EGR amount or a supercharge pressure is corrected.

When a failure occurs in the combustion sensor due to an open circuit or a short circuit, the sensed value of the combustion sensor is fixed to an abnormal value. Thus, an open-or-short failure that is the open circuit or the short circuit can be diagnosed based on whether the sensed value is fixed to the abnormal value. It is possible that a failure (intermediate value failure) where the sensed value is not fixed to the abnormal value occurs due to a deterioration over time in the combustion sensor, in a case where the combustion sensor outputs a value offset from a normal value or in a case where the combustion sensor outputs a value according to an erroneous gain. According to Patent Literature 1, the intermediate value failure can be diagnosed from the sensed value when the combustion does not occur such as a case where a fuel injection is stopped.

PRIOR ART LITERATURES

Patent Literature

[Patent Literature 1] JP2010-127172A

SUMMARY OF INVENTION

A characteristic of the fuel supplied to the combustion system such as a kinematic viscosity of the fuel, a density of the fuel, a volatility of the fuel and an ignitionability of the fuel, differs according to a mining place of the fuel or a refining place of the fuel. When the combustion control is executed to fit to the characteristic of the fuel, an emission of an exhaust gas or a fuel consumption may be improved. In a conventional technology, a sensor (characteristic sensor) is provided to sense the characteristic of the fuel, and the target values are corrected according to the characteristic sensed by the characteristic sensor.

The intermediate value failure of the combustion sensor can be diagnosed from the sensed value when the combustion does not occur. However, it is difficult to diagnose the intermediate value failure of the characteristic sensor.

It is an object of the present disclosure to provide a sensor failure diagnostic apparatus which can diagnose an intermediate value failure of a characteristic sensor sensing a fuel characteristic.

According to a first aspect of the present disclosure, the sensor failure diagnostic apparatus is applied to a combustion system including a combustion sensor that senses a combustion parameter indicating a combustion state of an internal combustion engine and a characteristic sensor that senses a characteristic parameter indicating a characteristic of a fuel used in a combustion of the internal combustion engine. The sensor failure diagnostic apparatus determines whether a failure of the combustion sensor or a failure of the characteristic sensor exists. The sensor failure diagnostic apparatus includes a first estimation unit to estimate a mixing ratio of each of types of a molecular structure included in the fuel, based on the combustion parameters when the combustion is executed in different combustion conditions, among the combustion parameters sensed by the combustion sensor, a second estimation unit to estimate the mixing ratio, based on the characteristic parameters sensed by the characteristic sensor, a combustion sensor diagnostic unit to determine whether the failure of the combustion sensor exists, based on a sensed value of the combustion sensor when the combustion is not executed in the internal combustion engine, and a characteristic sensor diagnostic unit to determine whether the failure of the characteristic sensor exists, by comparing the mixing ratio estimated by the first estimation unit with the mixing ratio estimated by the second estimation unit when the combustion sensor diagnostic unit determines that the combustion sensor is normal.

The value of the combustion parameter that includes the ignition delay time or the heat generation amount and is sensed by the combustion sensor differs according to combustion conditions including the cylinder pressure or the cylinder temperature. The variation of the combustion parameter relative to a variation of the combustion condition differs due to the variation of the mixing ratio of each molecular structure type included in the fuel. For example, a characteristic map indicating a relationship between the cylinder pressure and the ignition delay time differs due to the variation of the mixing ratio for each of types of the molecular structure in the fuel include a normal paraffin type, a side chain paraffin type, a naphthenic type and an aromatic type. When the variation of the combustion parameter according to the variation of the combustion condition is sensed, the mixing ratio of each molecular structure type can be estimated. The inventors obtain that the mixing ratio of each molecular structure type included in the fuel can be estimated from the combustion parameters in different combustion conditions.

A combination of the characteristic parameters including the kinematic viscosity or the density and sensed by the characteristic sensor has a correlation with the mixing ratio. When the characteristic parameter has one type, the characteristic parameters can be acquired in different conditions where the temperature of the fuel or the pressure of the fuel differs while the characteristic parameter is sensed. The combination of the characteristic parameters has a correlation with the mixing ratio. The inventors obtain that the mixing ratio of each molecular structure type included in the fuel can be estimated from the characteristic parameters.

According to the first aspect, the mixing ratio of each molecular structure type included in the fuel is estimated based on each combustion parameter when the combustion is executed in different combustion conditions among the combustion parameters sensed by the combustion sensor. The mixing ratio is estimated based on the characteristic parameters sensed by the characteristic sensor. When it is determined that the combustion sensor is normal, it is determined whether the characteristic sensor has failed by comparing the mixing ratio estimated from the combustion sensor and the mixing ratio estimated from the characteristic sensor.

When a deviation between the mixing ratio estimated from the combustion sensor and the mixing ratio estimated from the characteristic sensor becomes larger and the combustion sensor is normal, it is likely that the characteristic sensor has failed. Thus, according to the first aspect, it can be determined whether the characteristic sensor has failed. Specifically, a determination of the intermediate value failure of the characteristic sensor can be executed in addition of a determination of an open-or-short failure.

According a second aspect of the present disclosure, the sensor failure diagnostic apparatus is applied to a combustion system including a combustion sensor that senses a combustion parameter indicating a combustion state of an internal combustion engine and a characteristic sensor that senses a characteristic parameter indicating a characteristic of a fuel used in a combustion of the internal combustion engine. The sensor failure diagnostic apparatus determines whether a failure of the combustion sensor or a failure of the characteristic sensor exists. The sensor failure diagnostic apparatus includes an estimation unit to estimate the characteristic parameter, based on the combustion parameters when the combustion is executed in different combustion conditions, among the combustion parameters sensed by the combustion sensor, and a characteristic sensor diagnostic unit to determine whether the failure of the characteristic sensor exists, by comparing the characteristic parameter estimated by the estimation unit with the characteristic parameter sensed by the characteristic sensor.

The values of the combustion parameters including the ignition delay time and a heat generation amount sensed by the combustion sensor differ according to combustion conditions including the cylinder pressure and the cylinder temperature, as the above description. Levels of variations of the combustion parameters relative to the variations of the combustion conditions differ due to differences in fuel characteristics including the kinematic viscosity of the fuel and the density of the fuel. When variations of the combustion parameters are sensed according to the variations of the combustion conditions, the fuel characteristics can be estimated. In other words, the inventors obtain that the fuel characteristics can be estimated from the combustion parameters in different combustion conditions.

According to the second aspect, the characteristic parameter indicating the characteristic of the fuel is estimated based on the combustion parameter when the combustion is executed in different combustion conditions among the combustion parameters sensed by the combustion sensor. When it is determined that the combustion sensor is normal, it is determined whether the characteristic sensor has failed by comparing the characteristic parameter estimated from the combustion sensor with the characteristic parameter sensed from the characteristic sensor.

When a deviation between the characteristic parameter estimated from the combustion sensor and the characteristic parameter sensed from the characteristic sensor becomes larger and it is determined that the combustion sensor is normal, it is likely that the characteristic sensor has failed. Thus, according to the second aspect, it can be determined whether the characteristic sensor has failed. Specifically, a determination of the intermediate value failure of the characteristic sensor can be executed in addition of a determination of the open-or-short failure.

BRIEF DESCRIPTION OF DRAWINGS

The above and other objects, features and advantages of the present disclosure will become more apparent from the following detailed description made with reference to the accompanying drawings. In the drawings:

FIG. 2 is a graph showing an ignition delay time;

FIG. 3 is a diagram showing a relationship between plural ignition delay times, combustion conditions that are combinations of combustion environment values indicating easiness levels of combustions, and mixing mounts of various components;

FIG. 4 is a diagram showing a relationship between a characteristic line indicating a variation of the ignition delay time generated due to a cylinder oxygen concentration and a molecular structure type of a fuel;

FIG. 5 is a diagram showing a relationship between a characteristic line indicating a variation of the ignition delay time generated due to a cylinder temperature and the molecular structure type of the fuel;

FIG. 6 is a diagram showing a relationship between the characteristic line specified based on the ignition delay time and a mixing ratio of the molecular structure type;

DESCRIPTION OF EMBODIMENTS

Figure 1:
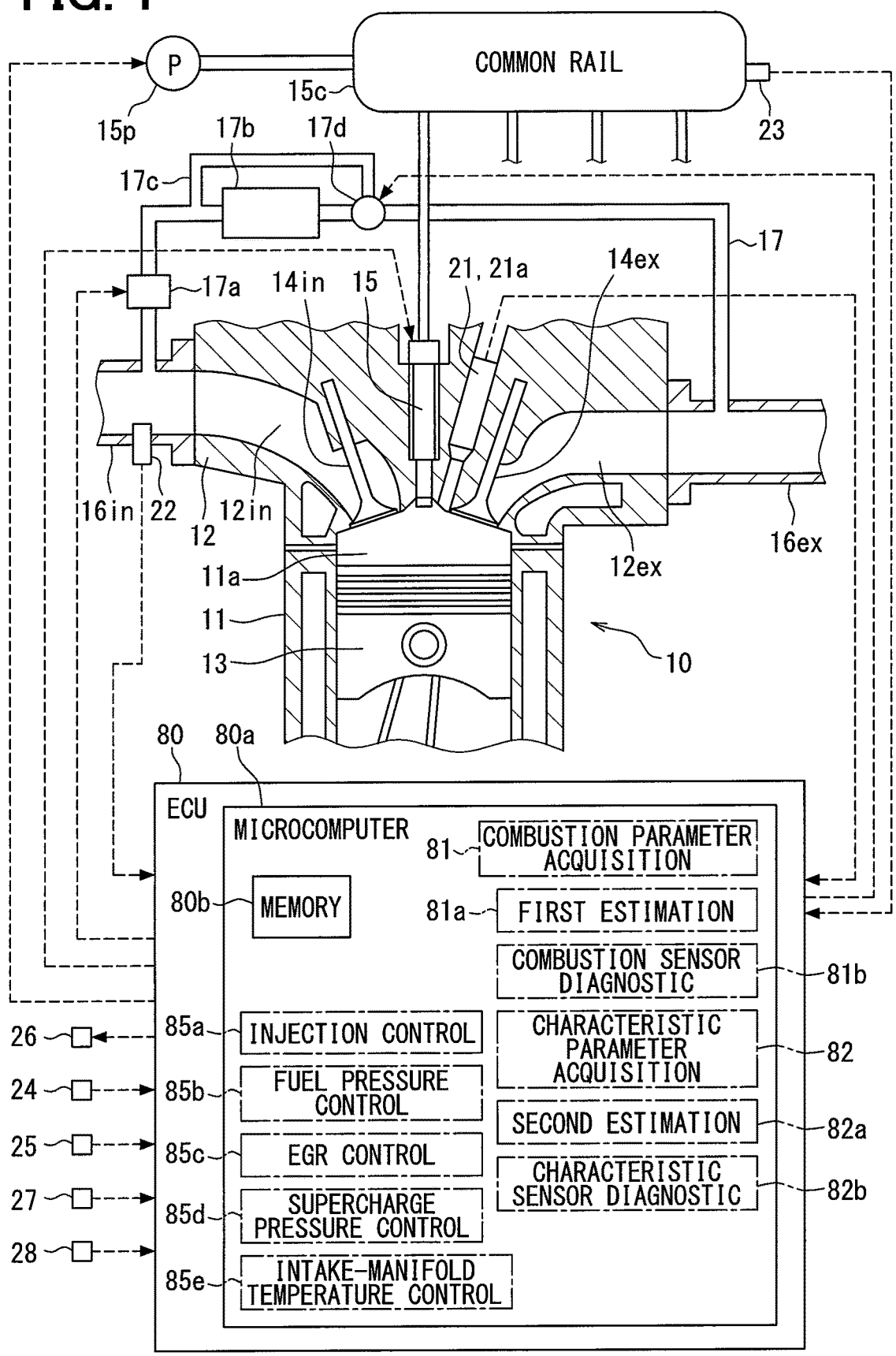
FIG. 1 is a diagram showing a sensor failure diagnostic apparatus and a combustion system of an internal combustion engine to which the sensor failure diagnostic apparatus is applied, according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration in each embodiment is changed, the other parts of the configuration can be configured as the same as a prior embodiment.

First Embodiment

According to an embodiment of the present disclosure, a sensor failure diagnostic apparatus is constituted based on an electric control unit (ECU) 80 shown in FIG. 1. The ECU 80 includes a microcomputer 80a, an input processing circuit that is not shown, and an output processing circuit that is not shown. The microcomputer 80a includes a central processing unit (CPU) that is not shown and a memory 80b. Since the CPU executes a specified program stored in the memory 80b, the microcomputer 80a controls operations of a fuel injector 15, a fuel pump 15p, an exhaust gas recirculation (EGR) valve 17a, a temperature regulating valve 17d, and a supercharge pressure-regulating apparatus 26 which are included in the combustion system. A combustion state in an internal combustion engine 10 included in the combustion system is controlled in a required state by the above controls. The combustion system and the ECU 80 are mounted to a vehicle, and the vehicle travels by using an output of the internal combustion engine 10 as a driving source.

The internal combustion engine 10 includes a cylinder block 11, a cylinder head 12, and a piston 13. The cylinder head 12 is provided with an intake valve 14in, an exhaust valve 14ex, the fuel injector 15, and a cylinder pressure sensor 21 that is a combustion sensor. A density sensor 27 sensing a density of the fuel and a kinematic viscosity sensor 28 sensing a kinematic viscosity of the fuel are located at a component defining a fuel passage including a common rail 15c or located at a fuel tank. A fuel density that is the density sensed by the density sensor 27 and the kinematic viscosity sensed by the kinematic viscosity sensor 28 are equivalent to characteristic parameters indicating a characteristic of the fuel. The density sensor 27 and the kinematic viscosity sensor 28 are equivalent to a characteristic sensor sensing a characteristic parameter.

The fuel pump 15p presses and feeds a fuel in the fuel tank to the common rail 15c. Since the ECU 80 controls the operation of the fuel pump 15p, the fuel is accumulated in the common rail 15c in a state where a pressure of the fuel is maintained to be a target pressure Ptrg. The common rail 15c distributes the fuel that is accumulated to the fuel injector 15 in each cylinder. The fuel injected from the fuel injector 15 is mixed with an intake gas to be a mixing gas in a combustion chamber 11a. The mixing gas is compressed by the piston 13 to be self-ignited. The internal combustion engine 10 is a diesel engine of a compression self-ignition type, and a light oil is used as the fuel.

The fuel injector 15 includes a body receiving an electromagnetic actuator and a valve member. When the ECU 80 controls to turn on the electromagnetic actuator, a leakage passage of a back-pressure chamber that is not shown is opened according to an electromagnetic attractive force, the valve member is opened according to a decreasing of a back pressure, an injection port arranged in the body is opened, and the fuel is injected from the injection port. When the ECU 80 controls to turn off the electromagnetic actuator, the valve member is closed, and a fuel injection is stopped.

An intake port 12in and an exhaust port 12ex which are arranged in the cylinder head 12 are connected with an intake pipe 16in and an exhaust pipe 16ex, respectively. The intake pipe 16in and the exhaust pipe 16ex are connected with an EGR pipe 17, and a part of an exhaust gas which is an EGR gas is introduced (returned) into the intake pipe 16in through the EGR pipe 17. The EGR pipe 17 is provided with the EGR valve 17a. Since the ECU 80 controls the operation of the EGR valve 17a, an opening degree of the EGR pipe 17 is controlled, and a flow rate of the EGR gas is controlled.

An EGR cooler 17b which cools down the EGR gas, a bypass pipe 17c, and the temperature regulating valve 17d are arranged at positions in the EGR pipe 17 upstream of the EGR valve 17a. The bypass pipe 17c defines a bypass passage through which the EGR gas bypasses the EGR cooler 17b. Since the temperature regulating valve 17d adjusts an opening degree of the bypass passage, the temperature regulating valve 17d adjusts a ratio of the EGR gas flowing through the EGR cooler 17b relative to the EGR gas flowing through the bypass passage, and adjusts a temperature of the EGR gas flowing into the intake pipe 16in. In this case, the intake gas flowing into the intake port 12in includes an exterior air (fresh air) flowing from the intake pipe 16in and the EGR gas. Therefore, when the temperature regulating valve 17d adjusts the temperature of the EGR gas, the temperature regulating valve 17d also adjusts a temperature of the intake gas flowing into the intake port 12in. In this case, the temperature of the intake gas flowing into the intake port 12in is equivalent to an intake manifold temperature.

The combustion system includes a supercharger that is not shown. The supercharger includes a turbine that is mounted to the exhaust pipe 16ex, and a compressor that is mounted to the intake pipe 16in. When the turbine rotates according to a flow-rate energy of the exhaust gas, the compressor rotates by a rotational force of the turbine, and the fresh air is compressed (supercharged) by the compressor. The supercharge pressure-regulating apparatus 26 is an apparatus that changes a capacity of the turbine. Since the ECU 80 controls the operation of the supercharge pressure-regulating apparatus 26, the capacity of the turbine is adjusted, and a supercharge pressure is controlled by the compressor.

The ECU 80 receives detection signals from various sensors including the cylinder pressure sensor 21, an oxygen concentration sensor 22, a common-rail pressure sensor 23, a crank angle sensor 24, and an accelerator pedal sensor 25.

The cylinder pressure sensor 21 outputs the detection signal depending on a cylinder pressure that is a pressure in the combustion chamber 11a. The cylinder pressure sensor 21 includes a temperature detection element 21a besides a pressure detection element. The cylinder pressure sensor 21 outputs the detection signal depending on a cylinder temperature that is a temperature in the combustion chamber 11a. The oxygen concentration sensor 22 is mounted to the intake pipe 16in, and outputs the detection signal depending on a concentration of an oxygen in the intake gas. The intake gas that is a detection target includes the fresh air and the EGR gas. The common-rail pressure sensor 23 is mounted to the common rail 15c, and outputs the detection signal depending on a pressure of the fuel accumulated in the common rail 15c. In this case, the pressure of the fuel accumulated in the common rail 15c is referred to as a common-rail pressure. The crank angle sensor 24 outputs the detection signal depending on a rotational speed of a crank shaft that is rotatably driven by the piston 13. In this case, the rotational speed is equivalent to an engine speed that is a rotational speed of the crank shaft per unit time. The accelerator pedal sensor 25 outputs the detection signal depending on a pressing position of an accelerator pedal which is operated by a driver of the vehicle. In this case, the pressing position of the accelerator pedal is equivalent to an engine load.

The ECU 80 controls the operations of the fuel injector 15, the fuel pump 15*p*, the EGR valve 17*a*, the temperature regulating valve 17*d*, and the supercharge pressure-regulating apparatus 26, based on the detection signals. Therefore, the ECU 80 controls an injection start time point of the fuel, an injection amount of the fuel, an injection pressure of the fuel, an flowing amount of the EGR gas, the intake manifold temperature, and the supercharge pressure.

The microcomputer 80*a* of when controlling the operation of the fuel injector 15 functions as an injection control unit 85*a* to control the injection start time point of the fuel, the injection amount of fuel, and an injection number of a multiple injection. The microcomputer 80*a* of when controlling the operation of the fuel pump 15*p* functions as a fuel pressure control unit 85*b* to control the injection pressure. The microcomputer 80*a* of when controlling the operation of the EGR valve 17*a* functions as an EGR control unit 85*c* to control the flowing amount of the EGR gas. The microcomputer 80*a* of when controlling the operation of the supercharge pressure-regulating apparatus 26 functions as a supercharge pressure control unit 85*d* to control the supercharge pressure. The microcomputer 80*a* of when controlling the operation of the temperature regulating valve 17*d* functions as an intake-manifold temperature control unit 85*e* to control the intake manifold temperature.

The microcomputer 80*a* also functions as a combustion parameter acquisition unit 81 to acquire a sensed value of a physical amount relating to the combustion. In this case, the sensed value of the physical amount relating to the combustion is equivalent to a combustion parameter. According to the present embodiment, the combustion parameter is an ignition delay time TD shown in FIG. 2. As shown in FIG. 2, an injection instruction pulse indicates a pulse signal that is outputted from the microcomputer 80*a*. An energization of the fuel injector 15 is controlled according to the pulse signal. Specifically, the energization starts at a time point t1 that the injection instruction pulse is turned on, and continues in a pulse on period Tq. In other words, a timing that the injection instruction pulse is turned on controls the injection start time point. Further, the pulse on period Tq controls an injection time period of the fuel, and then controls the injection amount.

As shown in FIG. 2, an injection rate indicating an injection state of the fuel which is generated by a valve-opening operation and a valve-closing operation that are executed according to the pulse signal is relative to the injection amount. Specifically, an injection rate indicates the injection amount of the fuel injected per unit time. As shown in FIG. 2, a time delay exists between the time point t1 that the energization starts and a time point t2 that the injection is actually started. Further, a time delay exists between an energization complete time point and a time point that the injection is actually stopped. The pulse on period Tq controls an actual injection period Tq1.

As shown in FIG. 2, a heat generation rate indicates the combustion state of the fuel injected in the combustion chamber 11*a*. Specifically, the heat generation rate indicates a heat amount where the mixing gas including the fuel and the intake gas is self-ignited per unit time. As shown in FIG. 2, a time delay exists between the time point t2 that the injection is actually started and a time point t3 that the combustion is actually started. According to the present embodiment, a time period from the time point t1 to the time point t3 is referred to as the ignition delay time TD.

The combustion parameter acquisition unit 81 estimates the time point t3, based on a variation of the cylinder pressure sensed by the cylinder pressure sensor 21. Specifically, in a time period from a time point that the piston 13 reaches a top dead center to a time point that a crank angle rotates by a predetermined value, the combustion parameter acquisition unit 81 estimates a time point that the cylinder pressure rapidly increases as the combustion start time point that is the time point t3. The combustion parameter acquisition unit 81 calculates the ignition delay time TD based on an estimation result. Further, the combustion parameter acquisition unit 81 acquires various states in the combustion every time the combustion occurs. In this case, various states include combustion conditions. Specifically, the combustion parameter acquisition unit 81 acquires the cylinder pressure, the cylinder temperature, an intake-gas oxygen concentration, the injection pressure and a mixing gas flow rate, as a combustion environment value.

The combustion environment values are equivalent to parameters indicating easiness levels of the combustions. When the cylinder pressure right before the combustion occurs is higher and when the cylinder temperature right before the combustion occurs is higher and when intake-gas oxygen concentration is higher and when the injection pressure is higher and when the mixing gas flow rate is higher, the mixing gas becomes more easily self-ignited. The cylinder pressure and the cylinder temperature which are sensed at the time point t1 that the energization of the fuel injector 15 starts may be used as the cylinder pressure right before the combustion occurs and the cylinder temperature right before the combustion occurs, respectively. The cylinder pressure is sensed by the cylinder pressure sensor 21, the cylinder temperature is sensed by the temperature detection element 21*a*, the intake-gas oxygen concentration is sensed by the oxygen concentration sensor 22, and the injection pressure is sensed by the common-rail pressure sensor 23. The mixing gas flow rate is a flow rate of the mixing gas in the combustion chamber 11*a* right before the combustion occurs. Since the flow rate increases in accordance with an increase in engine speed, the flow rate is calculated based on the engine speed. The combustion parameter acquisition unit 81 stores the ignition delay time TD in association with a combination (combustion condition) of the combustion environment values correlative to the combustion used to estimate the ignition delay time, in the memory 80*b*.

The microcomputer 80*a* estimates mixing ratios of molecular structure types included in the fuel, based on plural combustion parameters sensed in different combustion conditions. The microcomputer 80*a* executing the above estimation is equivalent to a first estimation unit 81*a* estimating the mixing ratios based on the combustion parameters sensed in the cylinder pressure sensor 21.

For example, the microcomputer 80*a* calculates mixing amounts of various components by substituting the ignition delay times TD in different combustion conditions for those in an equation shown in FIG. 3. The microcomputer 80*a* calculates the mixing ratios of the various components by dividing a total sum of the mixing amounts by each of the mixing amounts.

As shown in FIG. 3, a molecular structure type is constituted by values arranged in a matrix including x rows and 1 column. The values in the matrix indicate the mixing amounts of the various components. The various components are components divided by types of a molecular structure. The types of the molecular structure include a normal paraffin type, a side chain paraffin type, a naphthenic type, and an aromatic type.

The constant is constituted by values arranged in a matrix including x rows and y columns. The values in the matrix are constants established based on a pretest. The combustion parameter is constituted by values arranged in a matrix including 1 row and y columns. The values in the matrix are the ignition delay times TD acquired by the combustion parameter acquisition unit 81. For example, the value arranged at 1st row and 1st column is the ignition delay time TD(i) that is acquired in a combustion condition i that is a specified combination of the combustion environment values, and the value arranged at 2nd row and 1st column is the ignition delay time TD(j) that is acquired in a combustion condition j. The combustion condition i and the combustion condition j are set based on values different in all of the combustion environment values. Hereinafter, P(i), T(i), O2(i) and Pc(i) indicate the cylinder pressure, the cylinder temperature, the intake-gas oxygen concentration and the injection pressure which are correlative to the combustion condition i, respectively. Further, P(j), T(j), O2(j) and Pc(j) indicate the cylinder pressure, the cylinder temperature, the intake-gas oxygen concentration, and the injection pressure which are correlative to the combustion condition j, respectively.

Next, referring FIGS. 4 to 6, a calculation of the molecular structure type will be described.

As shown in FIG. 4, since the mixing gas becomes more easily self-ignited when the cylinder oxygen concentration that is the concentration of the oxygen included in the mixing gas in the combustion becomes higher, the ignition delay time TD becomes shorter. Solid lines (1), (2), and (3) are characteristic lines indicating relationships between the cylinder oxygen concentrations and the ignition delay times TD. The characteristic lines are different according to the fuel. Specifically, the characteristic lines are different according to the mixing ratios of the molecular structure types included in the fuel. Therefore, when the combustion parameter acquisition unit 81 senses the ignition delay time TD of when the cylinder oxygen concentration is $O_2(i)$, the combustion parameter acquisition unit 81 can estimate one of the molecular structure types. When the combustion parameter acquisition unit 81 compares the ignition delay time TD of when the cylinder oxygen concentration is $O_2(i)$ with the ignition delay time TD of when the cylinder oxygen concentration is $O_2(j)$, the combustion parameter acquisition unit 81 can estimate the mixing ratio with a higher accuracy.

Similarly, as shown in FIG. 5, since the mixing gas becomes more easily self-ignited when the cylinder temperature becomes higher, the ignition delay time TD becomes shorter. Solid lines (1), (2), and (3) are characteristic lines indicating relationships between the cylinder temperatures and the ignition delay times TD. The characteristic lines are different according to the fuel. Specifically, the characteristic lines are different according to the mixing ratios of the molecular structure types included in the fuel. Therefore, when the combustion parameter acquisition unit 81 senses the ignition delay time TD of when the cylinder temperature is B1, the combustion parameter acquisition unit 81 can estimate one of the molecular structure types. When the combustion parameter acquisition unit 81 compares the ignition delay time TD of when the cylinder temperature is T(i) with the ignition delay time TD of when the cylinder temperature is T(j), the combustion parameter acquisition unit 81 can estimate the mixing ratio with a higher accuracy.

Similarly, since the mixing gas becomes more easily self-ignited when the injection pressure becomes higher, the ignition delay time TD becomes shorter. Specifically, sensitivities are different according to the mixing ratios of the molecular structure types included in the fuel. Therefore, when the combustion parameter acquisition unit 81 senses the ignition delay time TD of when the injection pressure differs, the combustion parameter acquisition unit 81 can estimate the mixing ratio further accurately.

The molecular structure type highly affecting the characteristic line correlative to the cylinder oxygen concentration as shown in FIG. 4 is different from the molecular structure type highly affecting the characteristic line correlative to the cylinder temperature as shown in FIG. 5. As the above description, the molecular structure types highly affecting the characteristic lines are different in plural combustion conditions which are correlative to the characteristic line. Therefore, the combustion parameter acquisition unit 81 can estimate the mixing ratio of the molecular structure type which is large or small as shown in FIG. 6, based on combinations of the ignition delay times TD acquired by setting combinations (combustion conditions) of the combustion environment values to different values. Hereafter, the cylinder oxygen concentration is referred to as a first combustion environment value, the cylinder temperature is referred to as a second combustion environment value. Further, the characteristic line correlative to the first combustion environment value is referred to as a first characteristic line, and the characteristic line correlative to the second combustion environment value is referred to as a second characteristic line.

As shown in FIG. 6, a molecular structure type A is the molecular structure type highly affecting the characteristic line (first characteristic line) correlative to the cylinder oxygen concentration that is the first combustion environment value. Further, a molecular structure type B is the molecular structure type highly affecting the characteristic line (second characteristic line) correlative to the cylinder temperature that is the second combustion environment value. Furthermore, a molecular structure type C is the molecular structure type highly affecting a third characteristic line correlative to a third combustion environment value. When a variation of the ignition delay time TD becomes larger relative to a variation of the first combustion environment value, the mixing of the molecular structure type A included in the mixing gas becomes higher. Similarly, when the variation of the ignition delay time TD becomes larger relative to a variation of the second combustion environment value, the mixing of the molecular structure type B included in the mixing gas becomes higher. Further, when the variation of the ignition delay time TD becomes larger relative to a variation of the third combustion environment value, the mixing of the molecular structure type C included in the mixing gas becomes higher. Thus, the combustion parameter acquisition unit 81 can estimate the mixing ratio of the molecular structure type A, the molecular structure type B, and the molecular structure type C, relative to the fuel (1), the fuel (2), and the fuel (3), respectively.

Figure 7:
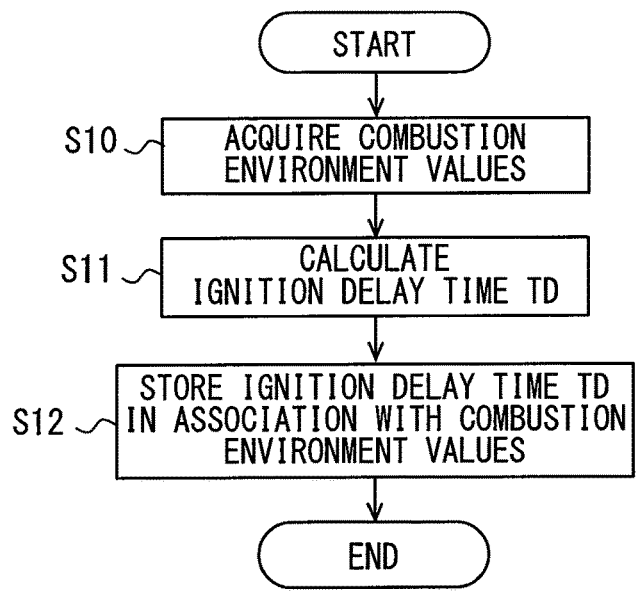
FIG. 7 is a flowchart showing a processing flow of a microcomputer shown in FIG. 1 which is a storing flow of an ignition delay time.

FIG. 7 is a flowchart showing a processing flow of a program executed by the combustion parameter acquisition unit 81. The processing flow is executed every time that a pilot injection is instructed. In one combustion cycle, it is possible that an injection control executes the multiple injection where the same fuel injector 15 is controlled to inject the fuel for plural times. In the multiple injection, an injection that injects the injection amount with a maximum value is referred to as a main injection, and an injection executed right before the main injection is referred to as the pilot injection.

First, at S10 in FIG. 7, the combustion parameter acquisition unit 81 acquires the combustion environment values. Next, at S11, the combustion parameter acquisition unit 81 estimates the time point t3 that is the combustion start time point based on a sensed value of the cylinder pressure sensor 21, and calculates the ignition delay time TD correlative to the pilot injection. Next, at S12, the combustion parameter acquisition unit 81 stores the ignition delay time TD calculated at S11 in association with the combustion environment values (combustion conditions) acquired at S10, in the memory 80b.

Specifically, a value range where the combustion environment values can be obtained is previously divided into plural regions, and combinations of regions of plural combustion environment values are previously established. As shown in FIG. 3, the ignition delay time TD(i) indicates the ignition delay time TD acquired in a case where regions of P(i), T(i), $O_2$(i) and Pc(i) are combined. Similarly, the ignition delay time TD(j) indicates the ignition delay time TD acquired in a case where regions of P(j), T(j), $O_2$(j) and Pc(j) are combined. At S12, the combustion parameter acquisition unit 81 determines whether a combustion condition that is a combination of plural parameters acquired at S10 is equivalent to one of the combinations (combustion conditions) that are previously established. Then, the combustion parameter acquisition unit 81 stores the ignition delay time TD calculated at S11, as the ignition delay time TD that corresponds to the combustion condition. In other words, the combustion parameter acquisition unit 81 stores the ignition delay time TD in association with the combustion condition.

It is possible that none of the combustion conditions which are previously established is equivalent to the combustion condition acquired at S10. In this case, the combustion parameter acquisition unit 81 terminates the processing flow shown in FIG. 7, without storing the ignition delay time TD in the memory 80b. When the ignition delay time TD correlative to the combustion condition that is equivalent to the combustion condition acquired at S10 has been stored in the memory 80b, the combustion parameter acquisition unit 81 updates the ignition delay time TD in the memory 80b by storing the ignition delay time TD that is calculated at S11 in the memory 80b.

Figure 8:
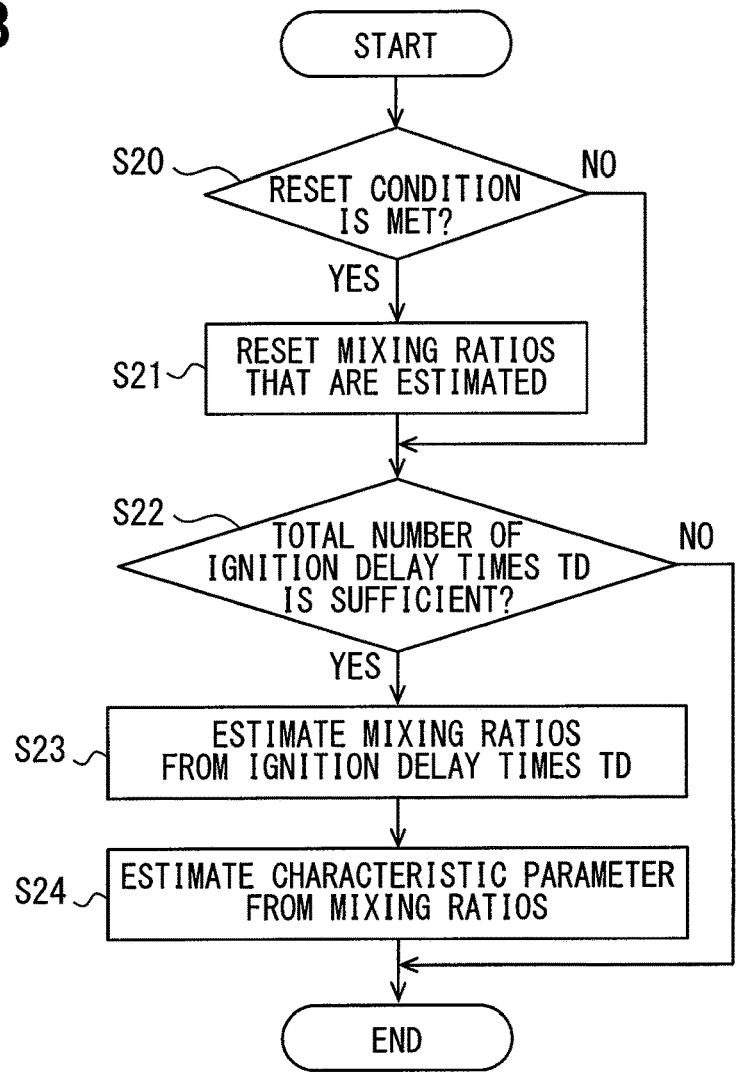
FIG. 8 is a flowchart showing a processing flow of the microcomputer shown in FIG. 1 which is an estimation flow of a mixing ratio of each of a molecular structure type.

FIG. 8 is a flowchart showing a processing flow of a program executed by the first estimation unit 81a. The above processing flow is repeatedly executed by the microcomputer 80a at a predetermined period, in an operation time interval of the internal combustion engine 10. First, at S20 in FIG. 8, when it is highly possible that the fuel stored in the fuel tank is mixed with other fuel in a case where a user supplies a fuel into the fuel tank, the first estimation unit 81a determines that the mixing ratios of the molecular structure types change and a reset condition is met. For example, when an increasing of a fuel surplus amount is sensed by a sensor sensing the fuel surplus amount in the fuel tank in a case where the internal combustion engine 10 is stopped, the first estimation unit 81a determines that the reset condition is met.

When the first estimation unit 81a determines that the reset condition is met, the first estimation unit 81a proceeds to S21. At S21, the first estimation unit 81a resets values of the mixing amounts which are estimated. In the above reset operation, the first estimation unit 81a resets the mixing amounts which are latest and are estimated at S23, and resets values of the ignition delay time TD stored according to the processing flow shown in FIG. 7. Thus, in a time period from a time point that a previous reset condition that is the reset condition used as a reference condition is met to a time point that a later reset condition that is the reset condition met right after the reference condition is met, the ignition delay time TD is continuously accumulated (added or sampled) in the memory 80b.

At S22, the first estimation unit 81a determines whether a total number (sampling number) of the ignition delay times TD stored in the memory 80b is sufficient to estimate the mixing ratios of the molecular structure type. Specifically, when the sampling number is greater than or equal to a predetermined value, the first estimation unit 81a determines that the sampling number is sufficient. Alternatively, when the ignition delay times TD relative to plural combustion conditions that are predetermined established among the combustion conditions equivalent to combinations of regions that are storage objects are stored, the first estimation unit 81a determines that the sampling number is sufficient.

When the first estimation unit 81a determines that the sampling number is sufficient, the first estimation unit 81a proceeds to S23. At S23, the first estimation unit 81a calculates the mixing amount of each of the molecular structure types, by substituting the ignition delay times TD that are sampled for those in the equation shown in FIG. 3. The first estimation unit 81a calculates the mixing ratio of each of the molecular structure types, based on the mixing amount of each of the molecular structure types which is calculated.

As the above description, the microcomputer 80a functions as the injection control unit 85a, the fuel pressure control unit 85b, and the EGR control unit 85c. The injection control unit 85a controls the injection start time point, the injection amount, and the injection number, by setting the pulse signal shown in FIG. 2, so as to control the injection start time point, the injection amount, and the injection number to be target values. In this case, the injection control unit 85a executes the injection control. The injection number is the injection number of the multiple injection.

The fuel pressure control unit 85b controls an operation of a regulating valve that controls a flow rate of the fuel suctioned in the fuel pump 15p. Specifically, the fuel pressure control unit 85b feedback controls the operation of the regulating valve, based on a difference between an actual common-rail pressure sensed by the common-rail pressure sensor 23 and the target pressure Ptrg that is a target value. Then, the fuel pressure control unit 85b controls a discharge amount of the fuel pump 15p per unit time, and controls the actual common-rail pressure to be the target value. In this case, the fuel pressure control unit 85b executes a fuel pressure control. The EGR control unit 85c controls a valve opening degree of the EGR valve 17a to control the EGR amount to be the target value. In this case, the EGR control unit 85c executes an EGR control.

Returning to explanation of FIG. 1, the microcomputer 80a also functions as a characteristic parameter acquisition unit 82 to acquire a physical amount (characteristic parameter) indicating the characteristic of the fuel. The characteristic parameter may include the kinematic viscosity of the fuel, the density of the fuel, an HC ratio of the fuel and a low-level heat dissipation amount of the fuel. The HC ratio is a ratio of an amount of a hydrogen and an amount of a carbon which are contained in the fuel. The lower-level heat dissipation amount is a heat dissipation amount that can be converted into a kinetic energy of the piston 13. A water vapor occurs in the combustion. When the water vapor exists at a water state, a vapor heat is also added to the heat dissipation amount. In this case, a heat amount obtained by adding the vapor heat to the low-level heat dissipation amount is referred to as a high-level heat dissipation amount.

The characteristic parameter acquisition unit 82 acquires the kinematic viscosity from the kinematic viscosity sensor 28 as a characteristic parameter while acquiring the density of the fuel from the density sensor 27 as a characteristic parameter. The density sensor 27 senses the density of the fuel, for example, based on a natural vibration period measuring method. The kinematic viscosity sensor 28 is a capillary viscometer or a kinematic viscosity meter based on a thin wire heating method. The fuel that is a detection subject of the density sensor 27 and the kinematic viscosity sensor 28 is the fuel in the fuel passage including the common rail 15c or the fuel in the fuel tank. It should be noted that the density sensor 27 and the kinematic viscosity sensor 28 are provided with a heater which is not shown and heats the fuel up to a specified temperature. Under such a condition, the fuel density and the kinematic viscosity are sensed.

The inventors know that a specified characteristic parameter of the fuel has a correlation with the mixing amount of each molecular structure type included in the fuel, and that each type of the characteristic parameter has a sensitivity with respect to the mixing amount of each molecular structure type. That is, an intermolecular combination force, a steric hindrance by a constitution or an interaction differs depend on the molecular structure of the fuel. Further, plural types of molecular structures are included in the fuel, and the mixing amounts of the molecular structures differ depend on each fuel. In this case, since it is considered that the sensitivity to the characteristic parameter varies among the molecular structures, the value of the characteristic parameter varies according to the molecular structure amount.

Figure 9:
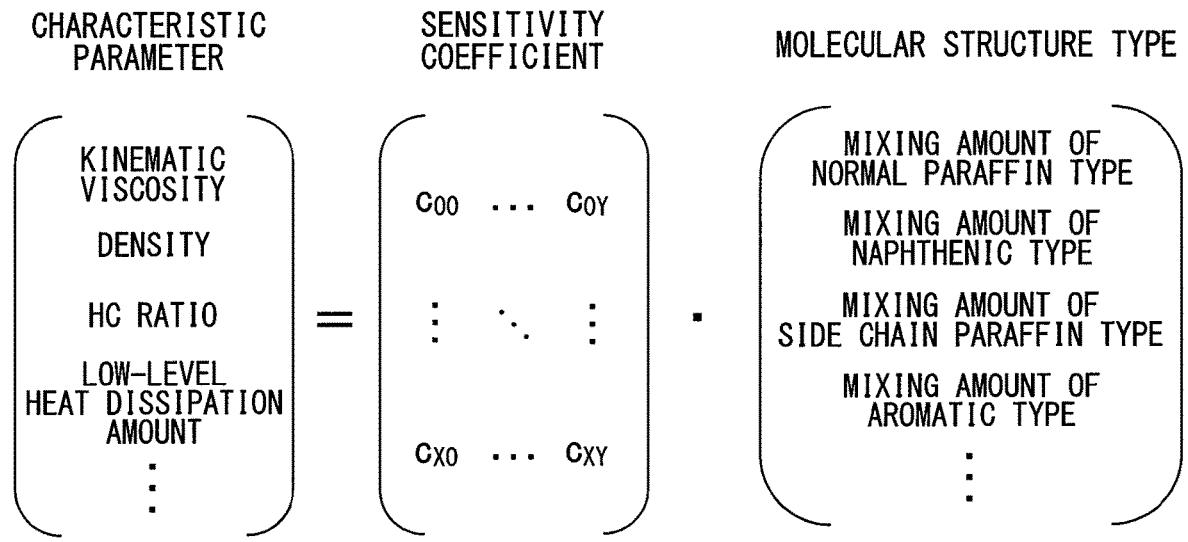
FIG. 9 is a graph showing a relationship between plural characteristic parameters, mixing amounts of the molecular structure types and sensitivity coefficients.

The inventors establish a correlation formula shown in FIG. 9 with respect to the characteristic parameter and the molecular structure. The correlation formula is a calculation equation of a characteristic calculation model which derives multiple characteristic parameters by reflecting a sensitivity coefficient to the multiple molecular structure amounts. The sensitivity coefficient indicates a dependence of the multiple molecular structure amounts with respect to the multiple characteristic parameters. In the correlation formula shown in FIG. 9, "c" is a sensitivity coefficient which indicates the sensitivity of each molecular structure for estimating each characteristic parameter. The sensitivity coefficient "c" is defined as a real number, according to the correlation of the characteristic parameter and molecular structure. However, a part of plural sensitivity coefficients may be zero.

Figure 10:
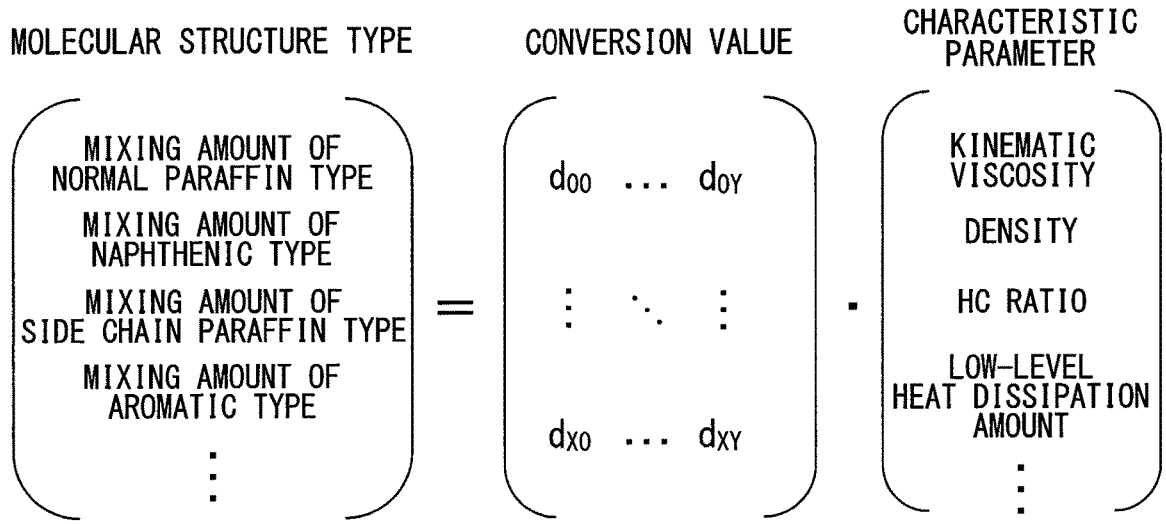
FIG. 10 is a diagram showing the mixing amounts of the molecular structure types, plural characteristic parameters, and conversion values.

Based on the correlation formula shown in FIG. 9, an inverse matrix of the mixing amount of each molecular structure type can be expressed by a correlation formula shown in FIG. 10. The mixing amount of each molecular structure type included in the fuel can be calculated by substituting plural characteristic parameter values in the correction formula. At this time, the molecular structure which serves as a calculation target among multiple types of molecular structures is specified, and only the conversion value "b" necessary for calculating the mixing amount of the molecular structure can be effective. For example, regarding to the characteristic parameter unnecessary for calculating the mixing amount, the conversion value "b" can be zero. The conversion value "b" is also a weighting value for each characteristic parameter. The correlation formula shown in FIG. 10 is a parameter calculating equation indicating the characteristic calculation model in the correction formula shown in FIG. 9 by a reverse model.

The kinematic viscosity and the density are information that can be measure by the density sensor 27 and the kinematic viscosity sensor 28. When the kinematic viscosity and the density are used in a vehicle including an automobile, the kinematic viscosity and the density can be acquired. Moreover, since a low-level heat dissipation amount has a correlation with the kinematic viscosity and the density of the fuel, the lower-level heat dissipation amount can be calculated in view of a map or an equation indicating the correlation. Moreover, since the HC ratio has a correlation with the low-level heat dissipation amount, the ratio HC can be calculated based on the low-level heat dissipation amount by using a map or an equation indicating the correlation. A parameter correlative to a cetane number or a distillation characteristic may be used as the characteristic parameter.

The mixing amount of each of the molecular structure types is calculated by substituting values of the characteristic parameters in the calculation equation shown in FIG. 10. The microcomputer 80a calculates the mixing ratios of various components by dividing a total sum of the mixing amounts by each of the mixing amounts. The microcomputer 80a estimates the mixing ratio of each of the molecular structure types based on the characteristic parameters for the molecular structure types included in the fuel. The microcomputer 80a executing the above estimation is equivalent to a second estimation unit 82a that estimates the mixing ratios based on the characteristic parameters sensed by the density sensor 27 and the kinematic viscosity sensor 28

Returning to explanation of FIG. 8, at S24, the microcomputer 80a calculates the characteristic parameters by substituting mixing ratios estimated at S23 in the correlation formula of FIG. 9, after estimating the mixing ratios at S23. The microcomputer 80a executing an operation of S24 is equivalent to an estimation unit that estimates the characteristic parameters based on each combustion parameter in different combustion conditions.

Figure 11:
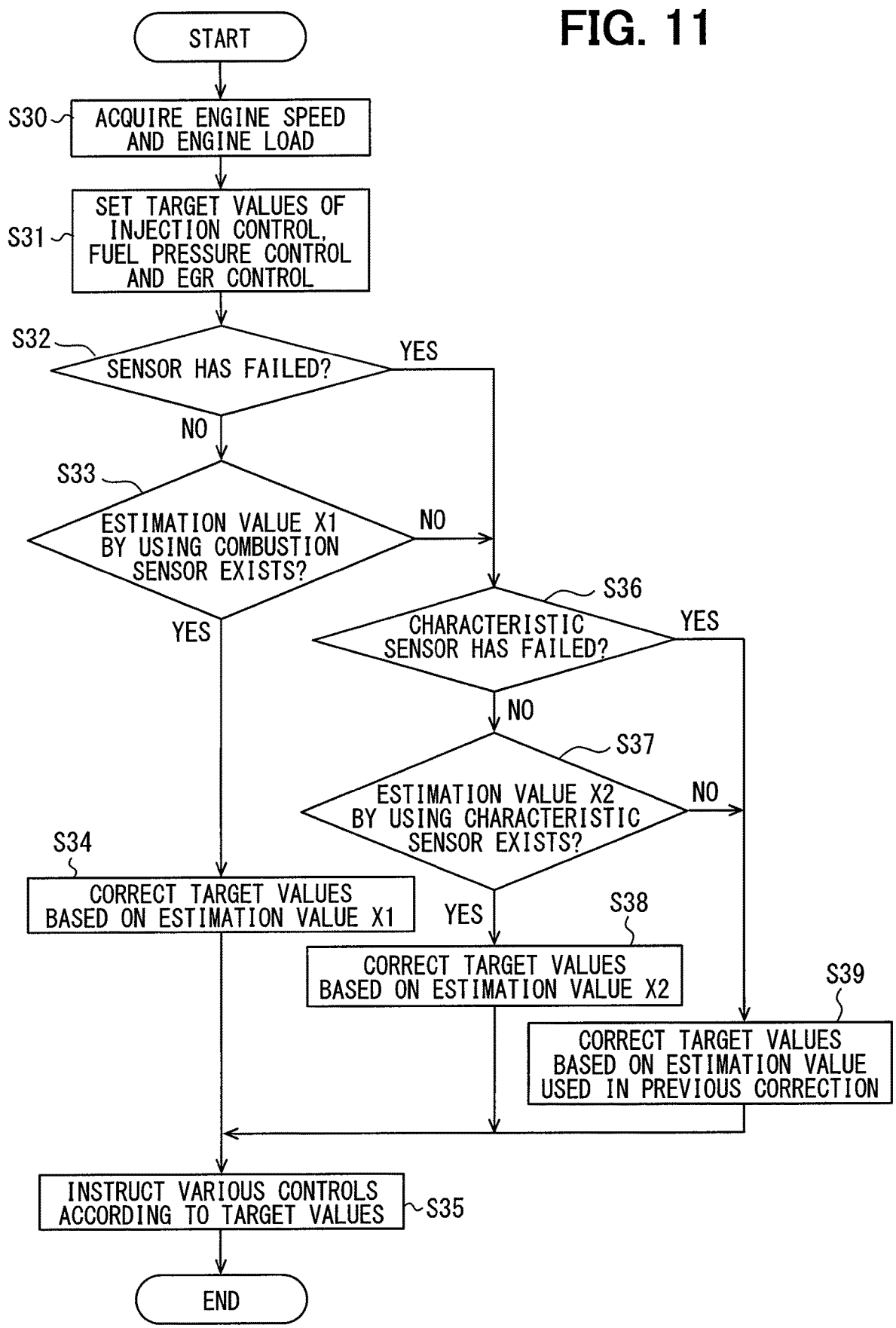
FIG. 11 is a flowchart showing a processing flow of the microcomputer shown in FIG. 1 which is a control flow of the combustion system.

FIG. 11 is a flowchart showing a processing flow of a program executed by the injection control unit 85a, the fuel pressure control unit 85b and the EGR control unit 85c. The above processing flow is repeatedly executed by the microcomputer 80a at a predetermined period, in the operation time interval of the internal combustion engine 10. First, at S30 in FIG. 11, the microcomputer 80a acquires the engine speed, the engine load, and an engine coolant temperature. At S31, the microcomputer 80a sets the target values correlative to the injection control executed by the injection control unit 85a, the fuel pressure control executed by the fuel pressure control unit 85b, and the EGR control executed by the EGR control unit 85c, based on the values acquired at S30.

At S32, the microcomputer 80a determines whether the cylinder pressure sensor 21 (combustion sensor) has failed. The above failure diagnosis is executed by operations shown in FIG. 12. When the microcomputer 80a determines that the cylinder pressure sensor 21 does not fail, the microcomputer 80a proceeds to S33. At S33, the microcomputer 80a determines whether a first estimation value X1 of the mixing ratio obtained by the first estimation unit 81a exists. A condition that the first estimation value X1 does not exist includes a condition that the first estimation value X1 is reset at S20 and a condition that a sampling number is insufficient at S22. When the microcomputer 80a determines that the first estimation value X1 by using the combustion sensor exists, the microcomputer 80a proceeds to S34. At S34, the microcomputer 80a corrects the target values set at S31 according to the first estimation value X1 of each mixing ratio. For example, the microcomputer 80a corrects at least one of the target values correlative to the injection control, the fuel pressure control and the EGR control, according to one of the fuels (1), (2), and (3) shown in FIG. 6. At S35, the microcomputer 80a outputs instruction signals to execute the injection control, the fuel pressure control and the EGR control, according to the target values corrected at S34, S38 or S39.

When the microcomputer 80a determines that the first estimation value X1 by using the combustion sensor does not exist at S33 or when the microcomputer 80a determines that the combustion sensor has failed at S32, the microcomputer 80a proceeds to S36. At S36, the microcomputer 80a determines whether it is determined that the density sensor 27 or the kinematic viscosity sensor 28 (characteristic sensor) has failed. The above failure diagnosis is executed by operations shown in FIG. 13. When the microcomputer 80a determines that the density sensor 27 and the kinematic viscosity sensor 28 do not fail, the microcomputer 80a proceeds to S37. At S37, the microcomputer 80a determines whether the second estimation value X2 of the mixing ratio obtained by the second estimation unit 82a exists. A condition that the second estimation value X2 does not exist includes a condition that the characteristic parameter to be substituted in the calculation equation shown in FIG. 10 is not acquired and a condition that the characteristic parameter that is acquired is reset. When it is highly possible that the fuel stored in the fuel tank is mixed with other fuel in a case where a user supplies a fuel into the fuel tank, the characteristic parameter changes, and a value of the characteristic parameter that is acquired is reset. When the microcomputer 80a determines that the second estimation value X2 by using the characteristic sensor exists, the microcomputer 80a proceeds to S38. At S38, the microcomputer 80a corrects the target values set at S31 according to the second estimation value X2 of each mixing ratio.

When the microcomputer 80a determines that the second estimation value X2 by using the characteristic sensor does not exist at S37 or when the microcomputer 80a determines that the characteristic sensor has failed at S36, the microcomputer 80a proceeds to S39. At S39, the microcomputer 80a corrects the target values based on the estimation value used in a previous correction.

When a failure occurs at the density sensor 27 and the kinematic viscosity sensor 28 (characteristic sensor) or at the cylinder pressure sensor 21 (combustion sensor) due to an open circuit or a short circuit, a sensed value of the sensor is fixed to an abnormal value. The microcomputer 80a diagnoses whether an open-or-short failure that is the open circuit or the short circuit occurs at the characteristic sensor or the combustion sensor, based on determining whether the sensed value is fixed to the abnormal value.

It is possible that a failure (intermediate value failure) where the sensed value is not fixed to the abnormal value occurs due to a deterioration over time in the sensors, in a case where the sensors output values offset from normal values or in a case where the sensors output values according to erroneous gains. The microcomputer 80a repeatedly executes failure diagnosis processings shown in FIGS. 12 and 13 at a predetermined cycle in the operation time interval of the internal combustion engine 10.

Figure 12:
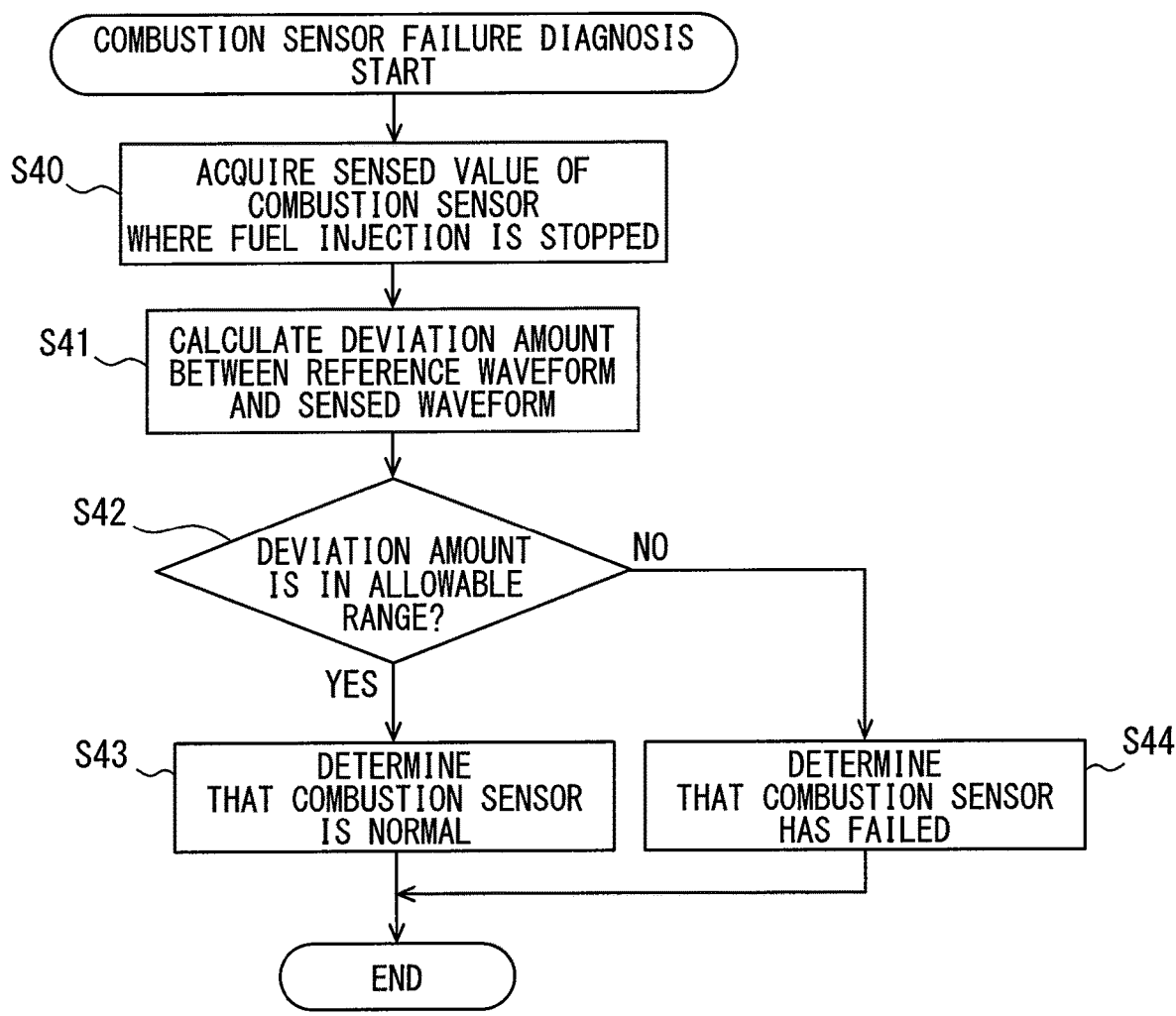
FIG. 12 is a flowchart showing a processing flow of the microcomputer shown in FIG. 1 which is a diagnosis flow diagnosing whether a failure of a combustion sensor exists.

At S40 in FIG. 12, the microcomputer 80a acquires sensed value of the cylinder pressure sensor 21 in a non-injection time interval where the fuel injection of the fuel injector 15 is stopped, and acquires a waveform (sensed waveform) obtained from the sensed values. For example, in the non-injection time interval, a waveform indicating a change of the cylinder pressure in a predetermined time interval at least including a compression stroke is a waveform (reference waveform) that is previously assumed. At S41, the microcomputer 80a calculates a deviation amount between the reference waveform and the sensed waveform sensed by the cylinder pressure sensor 21 in the predetermined time interval.

At S42, the microcomputer 80a determines whether the deviation amount calculated at S41 is in an allowable range. When the microcomputer 80a determines that the deviation amount is in the allowable range, the microcomputer 80a proceeds to S43. At S43, the microcomputer 80a determines that the cylinder pressure sensor 21 is normal. When the microcomputer 80a determines that the deviation amount is out of the allowable range, the microcomputer 80a proceeds to S44. At S44, the microcomputer 80a determines that the cylinder pressure sensor 21 has failed. The microcomputer 80a executing the processing in FIG. 12 functions as the combustion sensor diagnostic unit 81b in FIG. 1.

Figure 13:
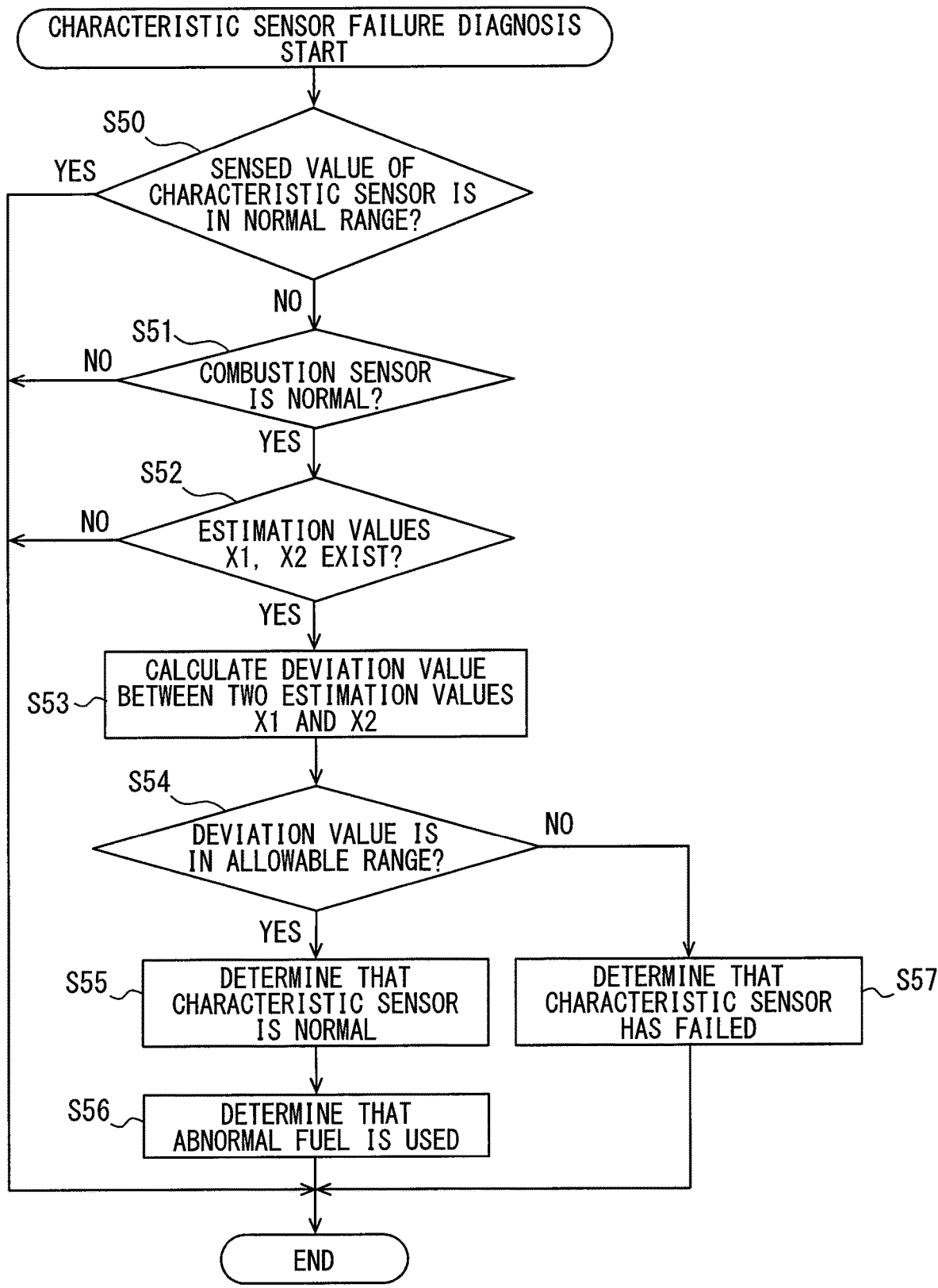
FIG. 13 is a flowchart showing a processing flow of the microcomputer shown in FIG. 1 which is a diagnosis flow diagnosing whether a failure of a characteristic sensor exists.

At S50 in FIG. 13, the microcomputer 80a determines whether the sensed value of the characteristic sensor is in a normal range. For example, the normal range that is assumed from a kinematic viscosity of a fuel that circulates in a market is previously set and is stored, and the above determination can be executed by comparing the sensed value with the normal range. When the microcomputer 80a determines that the sensed value is not in the normal range, the microcomputer 80a proceeds to S51. At S51, the microcomputer 80a determines whether the combustion sensor is normal. In other words, the microcomputer 80a acquires a determination result of S42 in FIG. 12. When the microcomputer 80a determines that the combustion sensor is normal, the microcomputer 80a proceeds to S52. At S52, the microcomputer 80a determines whether the first estimation value X1 obtained by the first estimation unit 81a and the second estimation value X2 obtained by the second estimation unit 82a exist. The above determination is the same as that in S33 and S37 in FIG. 11. When the microcomputer 80a determines that the first estimation value X1 and the second estimation value X2 exist at S52, the microcomputer 80a proceeds to S53. At S53, the microcomputer 80a calculates a deviation value between the first estimation value X1 and the second estimation value X2. In other words, the microcomputer 80a calculates a difference between the first estimation value X1 and the second estimation value X2 for each mixing ratio.

At S54, the microcomputer 80a determines whether the deviation value calculated at S53 is in an allowable range. For example, when all of mixing ratios are in the allowable range, the microcomputer 80a determines a positive determination and proceeds to S55. At S55, the microcomputer 80a determines that the characteristic sensor is normal. At S56, the microcomputer 80a determines that an abnormal fuel is used. In other words, the microcomputer 80a determines that a normal fuel that is assumed is not used. When the microcomputer 80a determines that the deviation value is out of the allowable range at S54, the microcomputer 80a proceeds to S57. At S57, the microcomputer 80a determines that the characteristic sensor has failed. The microcomputer 80a executing the processing in FIG. 13 functions as a characteristic sensor diagnostic unit 82b.

As the above description, the sensor failure diagnostic apparatus according to the present embodiment is provided by the ECU 80. The ECU 80 includes the first estimation unit 81a, the second estimation unit 82a, the combustion sensor diagnostic unit 81b and the characteristic sensor diagnostic unit 82b. Since the mixing ratio of each molecular structure type included in the fuel is estimated by the first estimation unit 81a based on each combustion parameter when the combustion is executed in different combustion conditions, the mixing ratio can be estimated with a high accuracy. Since the mixing ratio is estimated by the second estimation unit 82a based on the characteristic parameters, the mixing ratio can be estimated with a high accuracy. Since it is determined whether the combustion sensor has failed by the combustion sensor diagnostic unit 81b based on the sensed value of the combustion sensor when the combustion is not executed, the combustion sensor can be diagnosed with a high accuracy. Thus, when a deviation between the mixing ratio (first estimation value X1) estimated from the combustion sensor and the mixing ratio (second estimation value X2) estimated from the characteristic sensor becomes larger and it is determined that the combustion sensor is normal, it is likely that the characteristic sensor has failed. In view of the above, when it is determined that the combustion sensor is normal, the characteristic sensor diagnostic unit 82b determines whether the characteristic sensor has failed by comparing the first estimation value X1 with the second estimation value X2. Thus, it can be determined whether the intermediate value failure of the characteristic sensor occurs.

According to the present embodiment, the mixing ratio of each molecular structure type included in the fuel is estimated based on each combustion parameter when the combustion is executed in different combustion conditions among the combustion parameters sensed by the combustion sensor. The mixing ratio is estimated based on the characteristic parameters sensed by the characteristic sensor. When it is determined that the combustion sensor is normal, it is determined whether the characteristic sensor has failed by comparing the mixing ratio estimated from the combustion sensor and the mixing ratio estimated from the characteristic sensor.

When a deviation between the mixing ratio estimated from the combustion sensor and the mixing ratio estimated from the characteristic sensor becomes larger and the combustion sensor is normal, it is likely that the characteristic sensor has failed. Thus, according to the present embodiment, it can be determined whether the characteristic sensor has failed. Specifically, a determination of the intermediate value failure of the characteristic sensor can be executed in addition of a determination of the open-or-short failure.

According to the present embodiment, the types of the molecular structure include at least one of a normal paraffin type, a side chain paraffin type, a naphthenic type, or an aromatic type. In other words, the types of the molecular structure include one or more of the normal paraffin type, the side chain paraffin type, the naphthenic type, and the aromatic type. Since the above types of the molecular structure highly affect the combustion parameter, an estimation of the mixing ratios of the molecular structure types divided according to the above types is used to consider the mixing ratios in the controls correlative to the combustion, and a required combustion state can be accurately achieved.

According to the present embodiment, the characteristic parameters include at least one of the kinematic viscosity of the fuel, the density of the fuel, a ratio of hydrogen to carbon included in the fuel, or the low-level heat dissipation amount. In other words, the characteristic parameters include one or more of the kinematic viscosity of the fuel, the density of the fuel, the ratio of hydrogen to carbon included in the fuel, and the low-level heat dissipation amount. Since the mixing ratio of the molecular structure type highly affects the characteristic parameter, an estimation accuracy can be improved by estimating the mixing ratio from the characteristic parameters.

According to the present embodiment, the combustion condition is a condition specified by a combination of combustion condition values of plural types. In other words, the microcomputer 80a acquires the combustion parameter in the combustion where the combustion condition value differs, for each of the combustion condition values. Thus, the microcomputer 80a acquires the combustion parameter in the combustion where the combustion condition value differs for the combustion condition value of the same type, and the microcomputer 80a can more accurately estimate the mixing ratios than that in a configuration where the mixing ratios are estimated based on the combustion condition and the combustion parameter.

According to the present embodiment, the combustion condition values include at least one of the cylinder pressure, the cylinder temperature, the intake-gas oxygen concentration, or the injection pressure. In other words, the combustion condition values include one or more of the cylinder pressure, the cylinder temperature, the intake-gas oxygen concentration, and the injection pressure. Since the combustion condition values highly affect the combustion state, the microcomputer 80a can accurately estimate the mixing ratios by using the combustion parameters in the combustion where the combustion conditions differ.

According to the present embodiment, the combustion characteristic value is the ignition delay time TD from a time point that the fuel injection is instructed to a time point that the fuel is self-ignited. Since the ignition delay time TD is highly affected by the mixing ratio of each molecular structure type, the microcomputer 80a can accurately estimate the mixing ratios based on the ignition delay time TD.

According to the present embodiment, the combustion parameter acquisition unit 81 acquires the combustion parameter correlative to the combustion of the fuel injected before the main injection. In other words, the combustion parameter acquisition unit 81 acquires the combustion parameter correlative to the combustion of the fuel injected in the pilot injection. Since the cylinder temperature becomes higher when the fuel in the main injection combusts, the fuel after the main injection becomes more easily to combust. In this case, the fuel after the main injection becomes more easily self-ignited. Thus, it is difficult that a variation of the combustion parameter is generated due to a difference in the mixing ratio of the fuel. Since the fuel injected before the main injection is not affected by a main combustion, it is likely that the variation of the combustion parameter is generated due to the difference in the mixing ratio of the fuel. An estimation accuracy of the mixing ratios can be improved by estimating the mixing ratios based on the combustion parameter.

According to the present embodiment, in the processing in FIG. 11, when the microcomputer 80a determines that the combustion sensor does not fail and the first estimation value X1 by using the combustion sensor exists, the microcomputer 80a executes various controls of the combustion system by using the first estimation value X1. When the microcomputer 80a determines that the combustion sensor has failed or the first estimation value X1 does not exist, the microcomputer 80a executes various controls of the combustion system by using the second estimation value X2. In other words, the first estimation value X1 has a priority higher than the second estimation value X2 to be used in various controls. Since an estimation accuracy of the first estimation value X1 is higher than that of the second estimation value X2, it can be achieved that various controls are controlled at the target values in a case where the first estimation value X1 has a higher priority to be used in the combustion system. In a time interval until the sampling number of the ignition delay time TD becomes sufficient at S22, the combustion system can be controlled by using the second estimation value X2.

Second Embodiment

Figure 14:
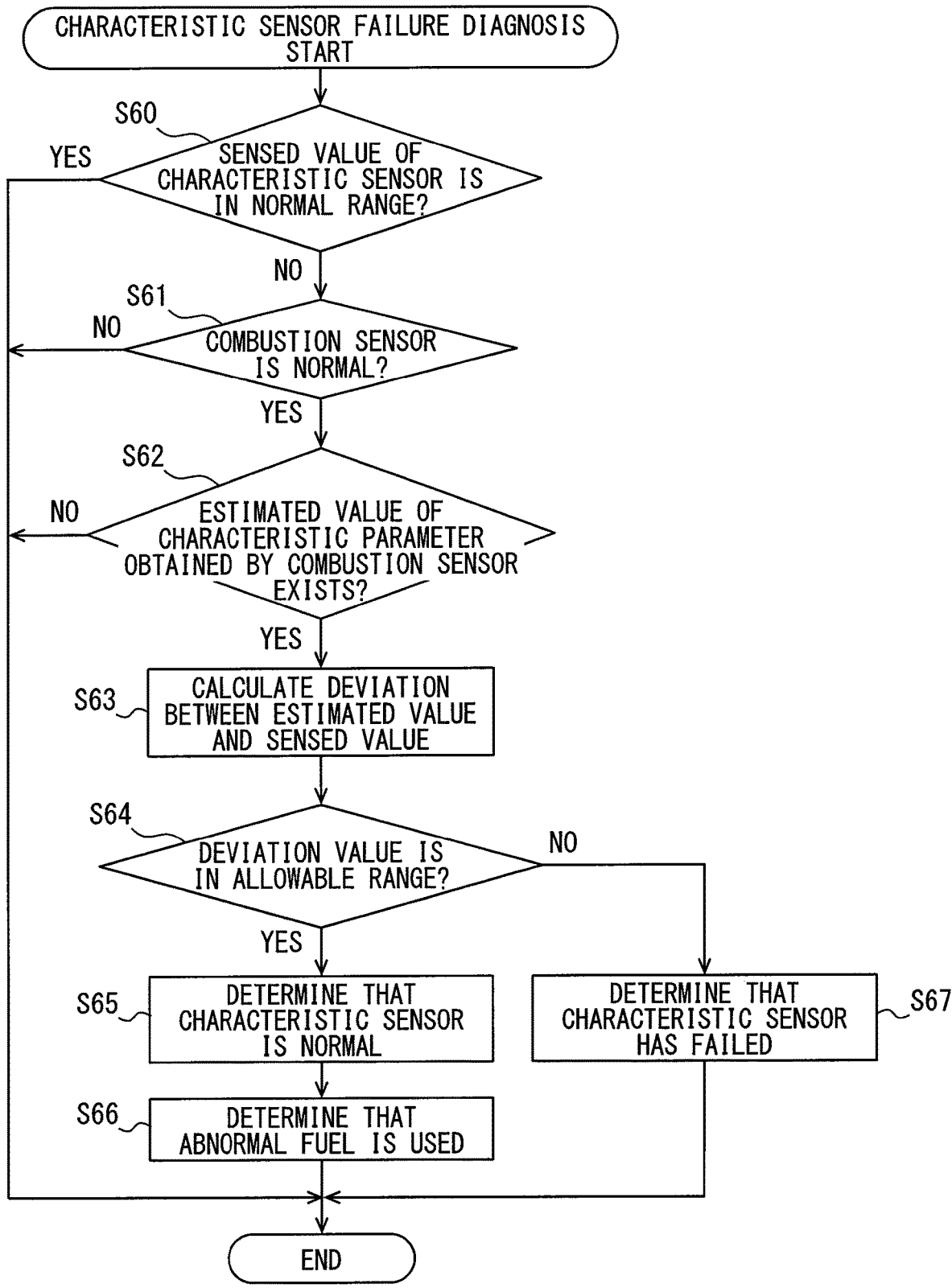
FIG. 14 is a flowchart showing the diagnosis flow diagnosing whether the failure of the characteristic sensor exists, according to a second embodiment of the present disclosure.

According to the present embodiment, a characteristic sensor failure diagnostic processing shown in FIG. 13 is replaced by a characteristic sensor failure diagnostic processing shown in FIG. 14. In the characteristic sensor failure diagnostic processing shown in FIG. 13, the microcomputer 80a determines whether the characteristic sensor has failed by comparing the mixing ratio (first estimation value X1) estimated by the first estimation unit 81a based on the combustion parameter with the mixing ratio (second estimation value X2) estimated by the second estimation unit 82a based on the characteristic parameter. According to the present embodiment, as shown in FIG. 14, the microcomputer 80a estimates the characteristic parameter based on the combustion parameter sensed by the combustion sensor, determines whether the characteristic sensor had failed by comparing an estimated value of the characteristic parameter with the characteristic parameter sensed by the characteristic sensor.

The values of the combustion parameters including the ignition delay time and a heat generation amount sensed by the combustion sensor differ according to combustion conditions including the cylinder pressure and the cylinder temperature, as the above description. Levels of variations of the combustion parameters relative to the variations of the combustion conditions differ due to differences in fuel characteristics including the kinematic viscosity of the fuel and the density of the fuel. When variations of the combustion parameters are sensed according to the variations of the combustion conditions, the fuel characteristics can be estimated. In other words, the inventors obtain that the fuel characteristics can be estimated from the combustion parameters in different combustion conditions.

At S60 and S61 in FIG. 14, the same as S50 and S51 in FIG. 13, the microcomputer 80a determines whether the sensed value of the characteristic sensor is in a normal range. When the microcomputer 80a determines that the sensed value of the characteristic sensor is not in the normal range, the microcomputer 80a determines whether the combustion sensor is normal. When the microcomputer 80a determines that the combustion sensor is normal, the microcomputer 80a proceeds to S62. At S62, the microcomputer 80a determines whether the value of the characteristic parameter estimated based on the combustion parameter exists. The microcomputer 80a calculates the value based on the mixing ratio calculated at S23 in FIG. 8. When the microcomputer 80a determines that the sampling number is sufficient at S22 in FIG. 8, the microcomputer 80a executes a calculation of the mixing ratio at S23. Thus, when the sampling number of the ignition delay time TD is sufficient, the value of the characteristic parameter estimated based on the combustion parameter exists.

When the microcomputer 80a determines that the estimated value of the characteristic parameter obtained by the combustion sensor at S62 exists, the microcomputer 80a proceeds to S63. At S63, the microcomputer 80a calculates a deviation amount between the characteristic parameter estimated by the sensed value of the combustion sensor and the characteristic parameter acquired by the characteristic parameter acquisition unit 82. In this case, the characteristic parameter estimated by the sensed value of the combustion sensor is the characteristic parameter calculated at S24 in FIG. 8. The microcomputer 80a calculates a deviation between the estimated value estimated from the combustion parameter sensed by the combustion sensor and the sensed value of the characteristic sensor, for each characteristic parameter.

At S64, the microcomputer 80a determines whether the deviation amount calculated at S63 is in an allowable range. For example, when all of the characteristic parameters are in the allowable range, the microcomputer 80a determines a positive determination and proceeds to S65. At S65, the microcomputer 80a determines that the characteristic sensor is normal. At S66, the microcomputer 80a determines that an abnormal fuel is used. In other words, the microcomputer 80a determines that a normal fuel that is assumed is not used. When the microcomputer 80a determines that the deviation value is out of the allowable range at S64, the microcomputer 80a proceeds to S67. At S67, the microcomputer 80a determines that the characteristic sensor has failed. The microcomputer 80a executing the processing in FIG. 14 functions as a characteristic sensor diagnosis unit.

As the above description, the sensor failure diagnostic apparatus according to the present embodiment is provided by the ECU 80. The ECU 80 includes the estimation unit at S24 and the characteristic sensor diagnostic unit at S65 and S67. The estimation unit estimates the characteristic parameter based on the combustion parameters when the combustion is executed in different conditions among the combustion parameters sensed by the combustion sensor. The characteristic sensor diagnostic unit determines whether the characteristic sensor has failed by comparing the characteristic parameter estimated by the estimation unit with the characteristic parameter sensed by the characteristic sensor.

According to the estimation unit, since the mixing ratio of each molecular structure type included in the fuel is estimated based on the combustion parameters when the combustion is executed in different combustion conditions, the mixing ratio can be estimated with a high accuracy. Since the characteristic parameter is estimated based on the mixing ratio that is estimated as the above, the characteristic parameter can be estimated with a high accuracy. Since it is determined whether the combustion sensor has failed by the combustion sensor diagnostic unit 81b based on the sensed value of the combustion sensor when the combustion is not executed, the combustion sensor can be diagnosed with a high accuracy. Thus, when a deviation between the characteristic parameter estimated from the combustion parameter sensed by the combustion sensor and the characteristic parameter sensed by the characteristic sensor becomes larger and it is determined that the combustion sensor is normal, it is likely that the characteristic sensor had failed. In view of the above, when it is determined that the combustion sensor is normal, the characteristic sensor diagnostic unit determines whether the characteristic sensor has failed by comparing the characteristic parameter that is estimated with the characteristic parameter that is sensed. Thus, it can be determined whether the intermediate value failure of the characteristic sensor occurs.

As the above description, according to the present embodiment, the characteristic parameter indicating the characteristic of the fuel is estimated based on the combustion parameter when the combustion is executed in different combustion conditions among the combustion parameters sensed by the combustion sensor. When it is determined that the combustion sensor is normal, it is determined whether the characteristic sensor has failed by comparing the characteristic parameter estimated from the combustion sensor with the characteristic parameter sensed from the characteristic sensor.

When a deviation between the characteristic parameter estimated from the combustion sensor and the characteristic parameter sensed from the characteristic sensor becomes larger and it is determined that the combustion sensor is normal, it is likely that the characteristic sensor has failed. Thus, according to the present embodiment, it can be determined whether the characteristic sensor has failed. Specifically, a determination of the intermediate value failure of the characteristic sensor can be executed in addition of a determination of the open-or-short failure.

Other Embodiment

The present disclosure is not limited to the embodiments mentioned above, and can be applied to various embodiments within the spirit and scope of the present disclosure. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

According to the above embodiments, as shown in FIG. 2, a time period from the time point t1 that the energization starts to the time point t3 that the combustion starts is defined as the ignition delay time TD. However, a time period from the time point t2 that the injection is started to the time point t3 that the combustion starts may be defined as the ignition delay time TD. The microcomputer 80a may detect a time point that a variation is generated in the fuel pressure including the common rail pressure when the injection is started and estimate the time point t2 that the injection is started based on the above detection time point.

As shown in FIG. 1, the combustion parameter acquisition unit 81 acquires the ignition delay time TD as the sensed value of the physical amount relating to the combustion. In this case, the sensed value of the physical amount relating to the combustion is equivalent to the combustion parameter. However, the combustion parameter acquisition unit 81 may acquire a waveform indicating a variation of the heat generation rate or acquire the heat generation amount that is an amount of the heat generated in the combustion of the fuel, as the combustion parameter. Further, the microcomputer 80a may estimate the mixing ratios of the various components based on plural types of the combustion parameters such as the ignition delay time TD, the waveform of the heat generation rate, and the heat generation amount. For example, the values of the constant shown in FIG. 3 may be set to values correlative to the plural types of the combustion parameters, and the microcomputer 80a may estimate the mixing ratios by substituting the plural types of the combustion parameters for the combustion parameters shown in FIG. 3.

As shown in FIG. 3, the combustion conditions are set such that all of the combustion environment values are different from each other for the ignition delay times TD. In other words, in combustion conditions i, j, k, and l which are specified combinations of the combustion environment values, the cylinder pressures are all set to different values P(i), P(j), P(k), and P(l), respectively. Similarly, the cylinder temperatures T, the intake-gas oxygen concentrations O2, and the injection pressures Pc are also set to different values. However, the microcomputer 80a may set at least one of the combustion environment values to be different from other combustion environment values, for the different combustion conditions. For example, in the combustion conditions i and j, the microcomputer 80a may set the cylinder temperatures T, the intake-gas oxygen concentrations O2, and the injection pressures Pc to be the same values, respectively, and set the cylinder pressures to be P(i) and P(j) which are different from each other.

According to the above embodiments, the combustion parameter acquisition unit 81 acquires the combustion parameter correlative to the combustion of the fuel injected right before the main injection. In other words, the microcomputer 80a acquires the combustion parameter correlative to the combustion of the fuel injected in the pilot injection. However, the microcomputer 80a may acquire the combustion parameter correlative to the combustion of the fuel injected after the main injection. Specifically, the microcomputer 80a may acquire the combustion parameter correlative to the combustion of the fuel injected in an after injection that is executed in the main combustion or a post injection that is executed after the main combustion. Moreover, when a multiple injection where the fuel is injected for plural times is executed before the main injection, a first injection of the multiple injection hardly affects the main injection. Therefore, it is preferable that the microcomputer 80a acquires the combustion parameter correlative to the combustion of the fuel injected in the first injection.

According to the above embodiments, the microcomputer 80a acquires the combustion parameter based on the sensed value of the cylinder pressure sensor 21. However, in a configuration that the cylinder pressure sensor 21 is not provided, the combustion system controller may estimate the combustion parameter based on a rotation variation of a rotation angle sensor. In this case, the rotation variation is a differential value. For example, the microcomputer 80a may estimate a time point that the differential value exceeds a predetermined threshold due to a pilot combustion as a pilot ignition time point. The microcomputer 80a can estimate a pilot combustion amount based on a magnitude of the differential value.

According to the first embodiment, as shown in FIG. 1, the cylinder temperature is sensed by the temperature detection element 21a. However, the cylinder temperature may be estimated based on the cylinder pressure sensed by the cylinder pressure sensor 21. Specifically, the cylinder temperature may be estimated by a calculation of the cylinder pressure, a cylinder capacity, a weight of a gas in the cylinder, and a gas constant.

According to the first embodiment, when the combustion parameter acquisition unit 81 calculates the mixing ratio of each molecular structure type by substituting the ignition delay time TD in the equation shown in FIG. 3, the combustion parameter acquisition unit 81 does not execute the calculation of the mixing ratio until all of the sampling numbers of the ignition delay times TD are obtained. Specifically, the combustion parameter acquisition unit 81 does not execute the calculation of the mixing ratio until all of the values to be substituted in the equation shown in FIG. 3 are obtained. When all of the values are not obtained, it is possible that the combustion parameter acquisition unit 81 calculates a part of the mixing ratios by changing the constants according to the sampling number. Alternatively, when the ignition delay time TD is not acquired, the combustion parameter acquisition unit 81 may calculate the mixing ratios by substituting nominal values for the ignition delay times TD in the equation shown in FIG. 3.

The characteristic parameter that includes the kinematic viscosity and the density and is sensed by the characteristic sensor differs according to a temperature of the fuel or the pressure of the fuel that is the detection target. A variation of the characteristic parameter relative to a variation of the temperature of the fuel or a variation the pressure of the fuel differs due to the mixing ratio of each molecular structure type included in the fuel. For example, a characteristic map indicating a relationship between the kinematic viscosity and the temperature of the fuel or a relationship between the kinematic viscosity and the pressure of the fuel differs due to a variation of the mixing ratio for each of types of the molecular structure in the fuel include a normal paraffin type, a side chain paraffin type, a naphthenic type and an aromatic type. When the variation of the characteristic parameter according to the variation of the temperature of the fuel or the variation of the pressure of the fuel is sensed, the mixing ratio of each molecular structure type can be estimated. The inventors obtain that the mixing ratio of each molecular structure type included in the fuel can be estimated from the characteristic parameters in different temperatures or in different pressures.

As the above description, the value of the combustion parameter that includes the ignition delay time or the heat generation amount and is sensed by the combustion sensor differs according to combustion conditions including the cylinder pressure or the cylinder temperature. The variation of the combustion parameter relative to a variation of the combustion condition differs due to the variation of the mixing ratio of each molecular structure type included in the fuel. For example, a characteristic map indicating a relationship between the cylinder pressure and the ignition delay time differs due to the variation of the mixing ratio for each of types of the molecular structure in the fuel include a normal paraffin type, a side chain paraffin type, a naphthenic type and an aromatic type. When the variation of the combustion parameter according to the variation of the combustion condition is sensed, the mixing ratio of each molecular structure type can be estimated. The inventors obtain that the mixing ratio of each molecular structure type included in the fuel can be estimated from the combustion parameters in different combustion conditions.

A combination of the characteristic parameters including the kinematic viscosity or the density and sensed by the characteristic sensor has a correlation with the mixing ratio. When the characteristic parameter has one type, the characteristic parameters can be acquired in different conditions where the temperature of the fuel or the pressure of the fuel differs while the characteristic parameter is sensed. The combination of the characteristic parameters has a correlation with the mixing ratio. The inventors obtain that the mixing ratio of each molecular structure type included in the fuel can be estimated from the characteristic parameters.

Thus, when the second estimation unit 82a estimates the mixing ratio based on the characteristic parameters, the second estimation unit 82a may substitute the characteristic parameters sensed in different temperature or different pressures in the equations of the characteristic parameters shown in FIGS. 9 and 10. In other words, the second estimation unit 82a may estimate the mixing ratio based on the characteristic parameters in different detection conditions.

For example, in a configuration where a density sensor 27 and a kinematic viscosity sensor 28 are provided with a heater, a fuel temperature condition is varied by varying a heating condition of the heater. The fuel density and the kinematic viscosity of the fuel are sensed with respect to each fuel temperature condition. In this case, the equations shown in FIGS. 9 and 10 are established with the characteristic parameters including the density of the fuel and the kinematic viscosity of the fuel in different fuel temperature conditions. The mixing ratio is calculated based on a model calculation equation that is equivalent to the equations shown in FIGS. 9 and 10.

For example, by arranging the density sensor 27 and the kinematic viscosity sensor 28 at multiple places where the fuel temperature and the fuel pressure are different from each other, the characteristic parameters may be obtained in different temperature conditions or different pressure conditions. In this case, each characteristic sensor is disposed on a place other than the fuel tank and is disposed to be different from other characteristic sensors. For example, the characteristic sensors are individually arranged on a passage from a fuel feed pump to a high-pressure pump, an inside of the common rail, and a passage from a pressure-reducing valve to a fuel tank. Thus, the density or the kinematic viscosity in different temperature conditions and different pressure conditions can be acquired, and the mixing ratio can be calculated by using the density or the kinematic viscosity that is acquired.

The mixing ratio may be calculated based on the characteristic parameters in a case where both the pressure condition and the temperature condition are different. Alternatively, the mixing ratio may be calculated based on the characteristic parameters in a case where one of the pressure condition and the temperature condition is different.

According to the first embodiment, the second estimation unit 82a estimates the mixing ratio based on both the characteristic parameter (fuel density) sensed by the density sensor 27 and the characteristic parameter (kinematic viscosity) sensed by the kinematic viscosity sensor 28. In other words, the second estimation unit 82a estimates the mixing ratio based on plural types of the characteristic parameters. Alternatively, the second estimation unit 82a may estimate the mixing ratio based on the characteristic parameter by one of the density sensor 27 and the kinematic viscosity sensor 28. In this case, the second estimation unit 82a estimates the mixing ratio based on the characteristic parameter sensed in different temperatures or different pressures. Characteristic parameters may be acquired by changing the detection condition, such as the temperature of the fuel and the pressure of the fuel, as the characteristic parameters of the fuel.

A calculation of the kinematic viscosity is not always necessary to be executed based on a sensed value by the kinematic viscosity sensor 28. For example, the fuel pressure in the fuel passage from the common rail 15c to an injection hole of the fuel injector 15 is sensed by a pressure sensor, and the pressure waveform indicating a variation of the sensed fuel pressure with time is obtained from the sensed fuel pressure. A velocity of the pressure waveform that is obtained may be calculated, and the density of the fuel or the kinematic viscosity of the fuel may be calculated based on the velocity of the pressure waveform.

The ECU 80 that is a sensor failure diagnostic apparatus has functions which can be achieved by a computer that executes a software stored in a memory that is substantial, a software, a hardware, or a combination of the above. For example, when the microcomputer 80a is constituted by a circuit that is a hardware, the circuit may include a digital circuit including plural logic circuit or may include an analog circuit.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. A sensor failure diagnostic apparatus for a combustion system including a combustion sensor configured to sense a combustion parameter indicating a combustion state of an internal combustion engine and a characteristic sensor configured to sense a characteristic parameter indicating a characteristic of a fuel used in a combustion of the internal combustion engine, the sensor failure diagnostic apparatus comprising:
    a first estimation unit configured to estimate a first mixing ratio of each of types of a molecular structure included in the fuel using the combustion parameters sensed by the combustion sensor when the combustion is executed in different combustion conditions;
    a second estimation unit configured to estimate a second mixing ratio using the characteristic parameters sensed by the characteristic sensor;
    a combustion sensor diagnostic unit configured to determine whether a failure of the combustion sensor exists by using values other than the first mixing ratio and the second mixing ratio; and
    a characteristic sensor diagnostic unit configured to, upon the combustion sensor diagnostic unit determining that the failure of the combustion sensor does not exist, determine whether a failure of the characteristic sensor exists by comparing a difference between the first mixing ratio and the second mixing ratio with a threshold value, wherein
    the values indicate a pressure in the internal combustion engine and are sensed by the combustion sensor when the combustion is not executed in the internal combustion engine.

2. The sensor failure diagnostic apparatus according to claim 1, wherein
    the types of the molecular structure include at least one of a normal paraffin type, a side chain paraffin type, a naphthenic type or an aromatic type.

3. The sensor failure diagnostic apparatus according to claim 1, wherein
    the characteristic parameter includes at least one of a kinematic viscosity of the fuel, a density of the fuel, a ratio of hydrogen to carbon included in the fuel or a low-level heat dissipation amount of the fuel.

4. The sensor failure diagnostic apparatus according to claim 1, wherein
    the combustion condition is a condition specified by a combination of plural types of combustion condition values, and
    the combustion condition values include at least one of a cylinder pressure, a cylinder temperature, an intake-gas oxygen concentration or a fuel injection pressure, in a combustion chamber of the internal combustion engine.

5. The sensor failure diagnostic apparatus according to claim 1, wherein
    the internal combustion engine is a compression self-ignition type, and
    the combustion parameter is a time period from a time point that the fuel is injected into a combustion chamber of the internal combustion engine to a time point that the fuel is self-ignited, or is a time period from a time point that the fuel injection is instructed to the time point that the fuel is self-ignited.

6. The sensor failure diagnostic apparatus according to claim 1, wherein a microcomputer acquires the values sensed by the combustion sensor and acquires a sensed waveform obtained from the sensed values.

7. A sensor failure diagnostic apparatus for a combustion system, comprising:
    a combustion sensor configured to sense a combustion parameter indicating a combustion state of an internal combustion engine;
    a characteristic sensor configured to sense a first characteristic parameter indicating a characteristic of a fuel used in a combustion of the internal combustion engine; and
    processing circuitry including at least one processor, the processing circuitry configured to:
        estimate a second characteristic parameter using the combustion parameters sensed by the combustion sensor when the combustion is executed in different combustion conditions, the first characteristic parameter and the second characteristic parameter each having a correlation with a mixing ratio of each of types of a molecular structure included in the fuel; and
        upon the combustion sensor being determined to be operating normally, determine whether the failure of the characteristic sensor exists, by comparing a difference between the first characteristic parameter and the second characteristic parameter with a threshold value.

8. The sensor failure diagnostic apparatus according to claim 7, wherein
    the characteristic parameter includes at least one of a kinematic viscosity of the fuel, a density of the fuel, a ratio of hydrogen to carbon included in the fuel or a low-level heat dissipation amount of the fuel.

9. The sensor failure diagnostic apparatus according to claim 7, wherein
    the combustion condition is a condition specified by a combination of plural types of combustion condition values, and
    the combustion condition values include at least one of a cylinder pressure, a cylinder temperature, an intake-gas oxygen concentration or a fuel injection pressure, in a combustion chamber of the internal combustion engine.

10. The sensor failure diagnostic apparatus according to claim 7, wherein
    the internal combustion engine is a compression self-ignition type, and
    the combustion parameter is a time period from a time point that the fuel is injected into a combustion chamber of the internal combustion engine to a time point that the fuel is self-ignited, or is a time period from a time point that the fuel injection is instructed to the time point that the fuel is self-ignited.

11. A sensor failure diagnostic apparatus, comprising:
    a combustion sensor configured to sense a combustion parameter indicating a combustion state of an internal combustion engine;
    a characteristic sensor configured to sense a characteristic parameter indicating a characteristic of a fuel used in a combustion of the internal combustion engine; and
    processing circuitry including at least one processor, the processing circuitry configured to:

estimate a first mixing ratio of each of types of a molecular structure included in the fuel using the combustion parameters sensed by the combustion sensor when the combustion is executed in different combustion conditions;

estimate a second mixing ratio using the characteristic parameters sensed by the characteristic sensor;

determine whether a failure of the combustion sensor exists by using values other than the first mixing ratio and the second mixing ratio; and upon determining that the failure of the combustion sensor does not exist, determine whether a failure of the characteristic sensor exists by comparing a difference between the first mixing ratio and the second mixing ratio with a threshold value, wherein the values indicate a pressure in the internal combustion engine and are sensed by the combustion sensor when the combustion is not executed in the internal combustion engine.

12. The sensor failure diagnostic apparatus according to claim 11, wherein a microcomputer acquires the values sensed by the combustion sensor and acquires a sensed waveform obtained from the sensed values.

* * * * *